United States Patent
Patel et al.

(10) Patent No.: US 11,191,106 B2
(45) Date of Patent: Nov. 30, 2021

(54) RANDOM ACCESS FOR LOW LATENCY WIRELESS COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/553,894

(22) Filed: Aug. 28, 2019

(65) Prior Publication Data

US 2019/0394810 A1     Dec. 26, 2019

Related U.S. Application Data

(63) Continuation of application No. 15/090,859, filed on Apr. 5, 2016, now Pat. No. 10,433,339.

(60) Provisional application No. 62/147,408, filed on Apr. 14, 2015.

(51) Int. Cl.
*H04W 74/00* (2009.01)
*H04W 74/08* (2009.01)

(52) U.S. Cl.
CPC ... *H04W 74/0833* (2013.01); *H04W 74/0891* (2013.01); *H04W 74/002* (2013.01)

(58) Field of Classification Search
CPC ........................ H04W 74/0833; H04W 74/002
USPC ......................................................... 370/329
See application file for complete search history.

(56) References Cited

U.S. PATENT DOCUMENTS

| | | | |
|---|---|---|---|
| 8,666,398 B2 | 3/2014 | Vajapeyam et al. |
| 2008/0316961 A1 | 12/2008 | Bertrand et al. |
| 2013/0058315 A1 | 3/2013 | Feuersaenger et al. |
| 2014/0029595 A1 | 1/2014 | Tsuboi et al. |
| 2014/0161089 A1 | 6/2014 | Ahn et al. |
| 2015/0016433 A1 | 1/2015 | Ramos et al. |
| 2016/0007377 A1 | 1/2016 | Frenne et al. |

(Continued)

FOREIGN PATENT DOCUMENTS

| CN | 104601313 A | 5/2015 |
|---|---|---|
| CN | 104919885 A | 9/2015 |

(Continued)

OTHER PUBLICATIONS

International Search Report and Written Opinion—PCT/US2016/026235—ISA/EPO—dated Jun. 22, 2016.

*Primary Examiner* — Angel T Brockman
(74) *Attorney, Agent, or Firm* — Qualcomm Incorporated

(57) ABSTRACT

Wireless devices may exchange data related to multiple available random access procedures for network access. A random access procedure of the available random access procedures may be selected, and a random access message transmitted based on the selected random access procedure. Available random access procedures may include procedures that provide for a different number of random access messages or that are for use in communications having different transmission time intervals (TTIs). The available random access procedures may include a contention-based random access procedure, in which an initial random access message may include a payload. In some examples, a number of random access resources may be provided within different frequency resources available to provide efficient usage of a channel bandwidth.

26 Claims, 17 Drawing Sheets

(56) References Cited

U.S. PATENT DOCUMENTS

| | | |
|---|---|---|
| 2016/0204847 A1 | 7/2016 | Ryu et al. |
| 2016/0309518 A1 | 10/2016 | Patel et al. |
| 2016/0345217 A1 | 11/2016 | Tabet et al. |
| 2017/0105127 A1 | 4/2017 | Xiong et al. |

FOREIGN PATENT DOCUMENTS

| | | |
|---|---|---|
| EP | 2728771 A2 | 5/2014 |
| JP | 2012165432 A | 8/2012 |
| KR | 20040103731 A | 12/2004 |
| KR | 20100019337 A | 2/2010 |
| KR | 20140085380 A | 7/2014 |
| WO | WO-2011130436 | 10/2011 |
| WO | WO2014028690 A1 | 2/2014 |
| WO | WO2014065593 A1 | 5/2014 |
| WO | WO2014112905 A1 | 7/2014 |
| WO | WO-2014206311 A1 | 12/2014 |
| WO | WO-2015038855 A1 | 3/2015 |

RANDOM ACCESS FOR LOW LATENCY WIRELESS COMMUNICATIONS

CROSS REFERENCES

The present application for patent is a Continuation of U.S. patent application Ser. No. 15/090,859 by Patel, et al., entitled, "Random Access For Low Latency Wireless Communications," filed Apr. 5, 2016, which claims priority to U.S. Provisional Patent Application No. 62/147,408, entitled "Random Access For Low Latency Wireless Communications," filed Apr. 14, 2015, assigned to the assignee hereof.

BACKGROUND

Field of the Disclosure

The present disclosure, for example, relates to wireless communication systems, and more particularly to random access techniques selected based on a latency level of communications of the wireless communication systems.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

y way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some wireless communications systems, wireless devices may gain system access through transmission of a request for access via a dedicated set of resources, or dedicated channel, provided to receive such requests. For example, a wireless communication system may be configured with a physical random access channel (PRACH) that a UE may use to transmit a random access request. According to various deployments of wireless communications systems, particular random access procedures may be provided. Because the dedicated channel that may be provided for random access requests may have limited resources, efficient techniques for random access may be desirable.

SUMMARY

Systems, methods, and apparatuses for random access to a wireless communications network are described. Wireless devices may exchange data related to multiple available random access procedures for network access. A random access procedure of the available random access procedures may be selected, and a random access message transmitted based on the selected random access procedure. Available random access procedures may include procedures that provide for a different number of random access messages or that are for use in communications having different transmission time intervals (TTIs). The available random access procedures may include a contention-based random access procedure, in which an initial random access message may include a payload. In some examples, a number of random access resources may be provided within different frequency resources available to provide efficient usage of a channel bandwidth.

A method of wireless communication at a wireless device is described. The method may include receiving signaling indicative of a set of physical random access channel (PRACH) procedures for use in accessing a wireless communications network, selecting one PRACH procedure of the set of PRACH procedures based at least in part on the received signaling, and transmitting a random access message according to the selected PRACH procedure.

An apparatus for wireless communication at a wireless device is described. The apparatus may include means for receiving signaling indicative of a set of physical random access channel (PRACH) procedures for use in accessing a wireless communications network, means for selecting one PRACH procedure of the set of PRACH procedures based at least in part on the received signaling, and means for transmitting a random access message according to the selected PRACH procedure.

A further apparatus for wireless communication at a wireless device is described. The apparatus may include a processor, memory in electronic communication with the processor, and instructions stored in the memory, wherein the instructions are executable by the processor to receive signaling indicative of a set of physical random access channel (PRACH) procedures for use in accessing a wireless communications network, select one PRACH procedure of the set of PRACH procedures based at least in part on the received signaling, and transmit a random access message according to the selected PRACH procedure.

A non-transitory computer-readable medium storing code for wireless communication at a wireless device is described. The code may include instructions executable to receive signaling indicative of a set of physical random access channel (PRACH) procedures for use in accessing a wireless communications network, select one PRACH procedure of the set of PRACH procedures based at least in part on the received signaling, and transmit a random access message according to the selected PRACH procedure.

A method of wireless communication at a wireless device is described. The method may include transmitting signaling indicative of a set of physical random access channel (PRACH) procedures for use in accessing a wireless communications network, and receiving a random access message according to a PRACH configuration of the set of PRACH configurations.

An apparatus for wireless communication at a wireless device is described. The apparatus may include means for transmitting signaling indicative of a set of physical random access channel (PRACH) procedures for use in accessing a wireless communications network, and means for receiving a random access message according to a PRACH configuration of the set of PRACH configurations.

A further apparatus for wireless communication at a wireless device is described. The apparatus may include a processor, memory in electronic communication with the processor, and instructions stored in the memory, wherein the instructions are executable by the processor to transmit signaling indicative of a set of physical random access channel (PRACH) procedures for use in accessing a wireless communications network, and receive a random access message according to a PRACH configuration of the set of PRACH configurations.

A non-transitory computer-readable medium storing code for wireless communication at a wireless device is described. The code may include instructions executable to transmit signaling indicative of a set of physical random access channel (PRACH) procedures for use in accessing a wireless communications network, and receive a random access message according to a PRACH configuration of the set of PRACH configurations.

A method of wireless communication at a wireless device is described. The method may include identifying a payload to be transmitted in a random access message, generating a random access message comprising the payload, and transmitting the random access message in a contention-based random access procedure.

An apparatus for wireless communication at a wireless device is described. The apparatus may include means for identifying a payload to be transmitted in a random access message, means for generating a random access message comprising the payload, and means for transmitting the random access message in a contention-based random access procedure.

A further apparatus for wireless communication at a wireless device is described. The apparatus may include a processor, memory in electronic communication with the processor, and instructions stored in the memory, wherein the instructions are executable by the processor to identify a payload to be transmitted in a random access message, generate a random access message comprising the payload, and transmit the random access message in a contention-based random access procedure.

A non-transitory computer-readable medium storing code for wireless communication at a wireless device is described. The code may include instructions executable to identify a payload to be transmitted in a random access message, generate a random access message comprising the payload, and transmit the random access message in a contention-based random access procedure.

A method of wireless communication at a wireless device is described. The method may include transmitting signaling indicative of a set of contention-based physical random access channel (PRACH) resources for use in accessing a wireless communications network, and receiving a random access message and an associated payload on a subset of the set of contention-based PRACH resources.

An apparatus for wireless communication at a wireless device is described. The apparatus may include means for transmitting signaling indicative of a set of contention-based physical random access channel (PRACH) resources for use in accessing a wireless communications network, and means for receiving a random access message and an associated payload on a subset of the set of contention-based PRACH resources.

A further apparatus for wireless communication at a wireless device is described. The apparatus may include a processor, memory in electronic communication with the processor, and instructions stored in the memory, wherein the instructions are executable by the processor to transmit signaling indicative of a set of contention-based physical random access channel (PRACH) resources for use in accessing a wireless communications network, and receive a random access message and an associated payload on a subset of the set of contention-based PRACH resources.

A non-transitory computer-readable medium storing code for wireless communication at a wireless device is described. The code may include instructions executable to transmit signaling indicative of a set of contention-based physical random access channel (PRACH) resources for use in accessing a wireless communications network, and receive a random access message and an associated payload on a subset of the set of contention-based PRACH resources.

A method of wireless communication at a wireless device is described. The method may include identifying a quantity of physical random access channel (PRACH) resources required for transmission of a random access message in a wireless communications network, identifying a set of frequency resources available for PRACH transmissions, stacking a plurality of PRACH resources required for transmission of a random access message within the set of frequency resources, and transmitting signaling indicative of the plurality of PRACH resources for use in accessing the wireless communications network.

An apparatus for wireless communication at a wireless device is described. The apparatus may include means for identifying a quantity of physical random access channel (PRACH) resources required for transmission of a random access message in a wireless communications network, means for identifying a set of frequency resources available for PRACH transmissions, means for stacking a plurality of PRACH resources required for transmission of a random access message within the set of frequency resources, and means for transmitting signaling indicative of the plurality of PRACH resources for use in accessing the wireless communications network.

A further apparatus for wireless communication at a wireless device is described. The apparatus may include a processor, memory in electronic communication with the processor, and instructions stored in the memory, wherein the instructions are executable by the processor to identify a quantity of physical random access channel (PRACH) resources required for transmission of a random access message in a wireless communications network, identify a set of frequency resources available for PRACH transmissions, stack a plurality of PRACH resources required for transmission of a random access message within the set of frequency resources, and transmit signaling indicative of the plurality of PRACH resources for use in accessing the wireless communications network.

A non-transitory computer-readable medium storing code for wireless communication at a wireless device is described. The code may include instructions executable to identify a quantity of physical random access channel (PRACH) resources required for transmission of a random access message in a wireless communications network, identify a set of frequency resources available for PRACH transmissions, stack a plurality of PRACH resources required for transmission of a random access message within the set of frequency resources, and transmit signaling indicative of the plurality of PRACH resources for use in accessing the wireless communications network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
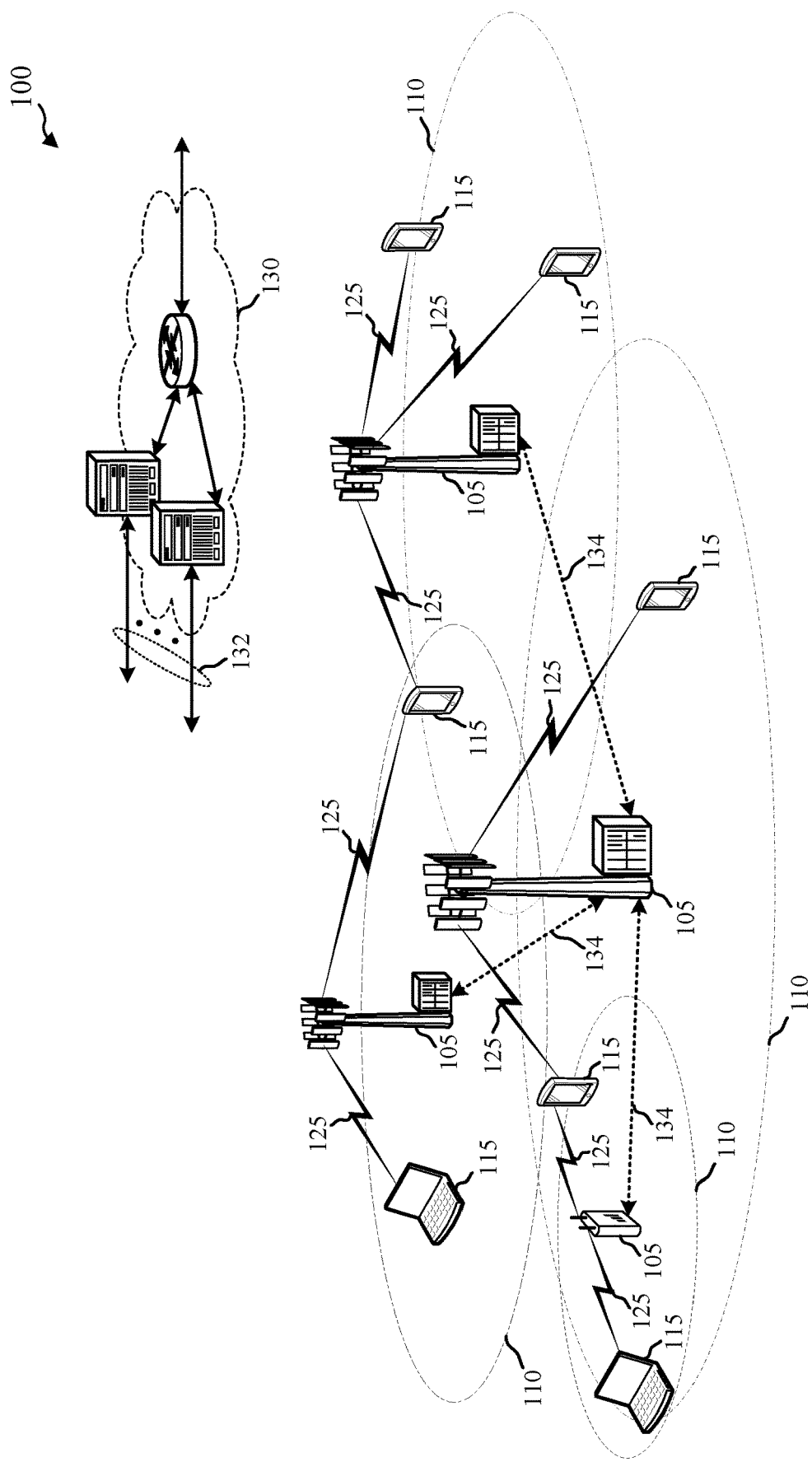
FIG. 1 illustrates an example of a wireless communications system for random access in low latency wireless communications in accordance with various aspects of the present disclosure.

In certain deployments of a wireless communications network, dual transmission time interval (TTI) structures may be supported, in which certain communications may be performed using a first TTI that is relatively long (e.g., 1 ms), and certain other communications may be performed using a second TTI that is shorter than the first TTI (e.g., a symbol level TTI) and that may provide ultra-low latency (ULL) communications. In certain other deployments, ULL communications may be supported in a stand-alone mode, without communications using the first TTI. The present disclosure describes various tools and techniques for providing random access to wireless communications networks that may provide dual TTIs, or that may provide stand-alone ULL communications.

As mentioned, wireless systems according to various aspects of the present disclosure may employ a dual TTI structure or may employ a stand-alone ULL structure. The ULL transmissions may be transparent to receiving devices that do not support ULL operations such that some devices may operate in the system without recognizing that a subframe includes ULL symbols. In some deployments, the numerology of such ULL symbols may be consistent with numerology for non-ULL system operation; ULL-capable UEs can utilize the ULL symbols while non-ULL UEs can readily ignore the symbols. As described herein, a system may leverage LTE numerology (e.g., timing, TTI structure, etc.) to minimize implementation effort and foster backwards compatibility. For instance, certain systems supporting ULL may include a 15 kHz tone spacing and a cyclic prefix (CP) duration of 71 µs. This approach may thus provide for integration of both ULL UEs and non-ULL or legacy UEs (e.g., UEs operating according to earlier versions of an LTE standard).

As mentioned above, and as further described herein, a ULL TTI structure may significantly reduce latency in a wireless system. For example, as compared to an LTE system without a ULL TTI structure, latency may be reduced from approximately 4 ms to approximately 300 µs. This represents more than an order of magnitude reduction in latency. Because a TTI for each ULL period may be a single symbol period, a potential latency reduction of 12× or 14× (for extended CP and normal CP, respectively) may be realized.

When seeking network access through a random access procedure, various aspects to the present disclosure provide that wireless devices may exchange data related to multiple available random access procedures for network access. In systems that provide for dual TTI structures for communications between a base station and a UE, a UE may use existing random access procedures associated with legacy TTI structures, according to some examples. In other examples, for systems that provide dual TTI structures, or for systems that may employ a stand-alone ULL TTI structure, a ULL physical random access channel (uPRACH) may be configured that uses ULL resources in a relatively efficient manner. Such uPRACH configuration may provide for different random access techniques, such as a two message payload-based random access sequence or a four message signature-based random access sequence. Additionally, frequency locations and time durations of uPRACH resources may be configured based on characteristics of the ULL TTI structure. Furthermore, random access responses of base stations may be provided based on random access requests and ULL TTI resources.

As mentioned, some examples may provide two or more available random access procedures, a random access procedure of the available random access procedures may be selected, and a random access message transmitted based on the selected random access procedure. Available random access procedures may include procedures that provide for a different number of random access messages or that are for use in communications having different transmission time intervals (TTIs). For example, a two message random access procedure and a four message random access procedure may be available, with a two message procedure or four message procedure available for access using the ULL TTI structure, and a four message procedure available for accessing the legacy TTI structure. In some examples, access to a ULL TTI system may be initially attempted using a two message access procedure, with the four message procedure used in the event that the two message procedure is not successful. In other examples, the two message procedure may be attempted based on certain conditions of the UE such as, for example, a timing advance of the UE, channel conditions associated with the UE, a time since a last synchronization of the UE, or combinations thereof. If a UE does not satisfy one or more of the conditions for attempting a two message random access procedure, the four message procedure may be used for random access.

In some aspects of the present disclosure, available random access procedures may include a contention-based random access procedure, in which an initial random access message may include a payload. In some examples, a number of random access resources may be provided within different frequency resources available to provide efficient usage of a channel bandwidth. Reference signal resources also may be associated with the different frequency resources, and a cyclic shift of a reference signal may be associated with a particular random access resource that is selected for the initial random access message. The available random access resources may be located symmetrically around the reference signal resources, for example. In some examples, the initial random access message may be spread using Walsh spreading across the available random access resources. Multiple UEs may use the available random access resources and reference signal resources to perform random access, and in the event of a collision a UE may retransmit a random access message following a backoff time period.

In other aspects of the present disclosure, a quantity of random access resources may be identified that are needed for transmission of a random access message, and an available system bandwidth for a ULL TTI based transmissions may be determined. In order to efficiently utilize available channel bandwidth, multiple sets of random access resources may be stacked in frequency to utilize a substantial amount of the available system bandwidth. For example, if a system bandwidth provides for 25 resource blocks (RBs) within a TTI, and random access resources take six RBs, four sets of random access resources may be configured for the TTI in order to occupy a substantial amount if system bandwidth, and avoid having to rate match around a random access resource allocation within a TTI.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 for random access in low latency wireless communications in accordance with various aspects of the present disclosure. The wireless communications system 100 includes base stations 105, multiple pieces of user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some aspects of the disclosure, wireless communications system 100 may utilize a dual TTI structure (e.g., at the subframe level and symbol-level) and also may support stand-alone ULL operation. In some instances, a UE 115 may need to seek access to a base station 105, such as when a UE 115 initially access the wireless communications system 100, if a UE 115 becomes unsynchronized with the wireless communications system 100, or during some handover procedures where a UE 115 may be handed over between different base stations 105, to name a few examples. UE 115 access in such cases may be initiated through a random access procedure using a physical random access channel (PRACH) that is established for such access (also referred to as PRACH procedures). According to some aspects of the disclosure, a base station 105 may provide multiple available PRACH procedures for network access. A UE 115 may select one of the available PRACH procedures, and a random access message may be transmitted based on the selected PRACH procedure. Available PRACH procedures may include procedures that provide for a different number of random access messages or that are for use in communications having different transmission time intervals (TTIs). The available PRACH procedures may include a contention-based random access procedure, in which an initial random access message may include a payload. In some examples, a number of PRACH resources may be provided that are stacked in frequency to provide efficient usage of a channel bandwidth. Available PRACH procedures and resources for systems that utilize ULL TTIs will be described in more detail below.

In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on internet protocol (IP). A radio link control (RLC) layer may perform packet segmentation and reassembly to communicate over logical channels. A medium access control (MAC) layer may perform priority handling and multiplexing of logical channels into transport channels. The transport channels may be in transport blocks at the bottom of the MAC. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels. For example, a MAC layer transport block may be mapped to a subframe at the PHY layer.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, or the like. The terms "carrier," "component carrier," and "cell" may be used interchangeably herein. A UE 115 may be configured with multiple downlink CCs and one or more uplink CCs for carrier aggregation. Carrier aggregation may be used with both FDD and TDD component carriers. In some cases, wireless communications system 100 may utilize enhanced CCs (eCC). An eCC may be characterized by features, including: flexible bandwidth, variable length TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

As mentioned above, wireless communications system 100 may utilize a dual TTI structure (e.g., at the subframe level and symbol-level) and also may support stand-alone ULL operation. ULL resources may be configured to provide various different physical channels, including uplink and downlink shared channels, uplink and downlink control channels, and random access channels. Various aspects of the disclosure provide ULL random access resources and procedures that may provide for efficient access to the wireless communications system 100 and that also provide for efficient use of system resources.

Figure 2:
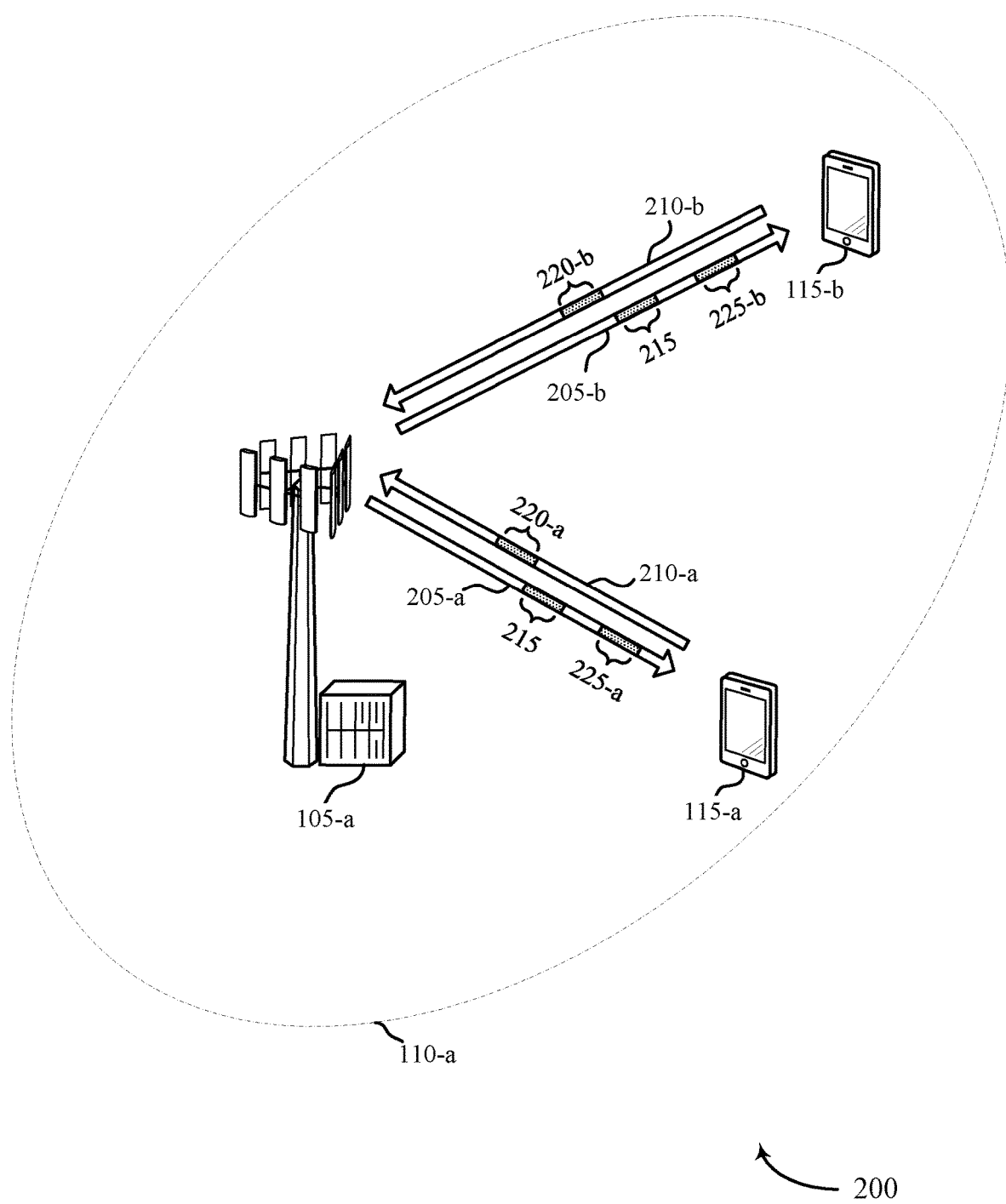
FIG. 2 illustrates an example of a wireless communications system for random access in low latency wireless communications in accordance with various aspects of the present disclosure.

FIG. 2 illustrates an example of a wireless communications system 200 for random access in low latency wireless communications in accordance with various aspects of the present disclosure. Wireless communications system 200 may include a first UE 115-a and a second UE 115-b, which may be examples of a UE 115 described with reference to FIG. 1. Wireless communications system 200 may also include a base station 105-a, which may be an example of a base station 105 described with reference to FIG. 1. Base station 105-a may transmit control and data to any UE 115 within its geographic coverage area 110-a via downlink (e.g., downlink 205). For instance, base station 105-a may transmit data to UE 115-a in downlink transmission 205-a, and UE 115-a may transmit data to base station 105-a in uplink transmission 210-a. Similarly, UE 115-b and base station 105-a may exchange data in downlink transmission 205-b and uplink transmission 210-b.

In some examples, wireless communications system 200 may use a ULL TTI structure, and may provide ULL physical random access channel (uPRACH) resources that are selected to provide for relatively efficient use of ULL channel resources. Base station 105-a may transmit uPRACH information 215 to UEs 115 as part of downlink transmissions 205. For example, uPRACH information 215 may be provided as part of system information that is broadcast by base station 105-a (e.g., in a system information block (SIB)). In some examples, uPRACH information 215 may include information on available random access sequences that may be used for network access by the UEs 115. For example, as mentioned above, two message and four message random access sequences may be provided, and uPRACH information 215 may include configurations for such random access sequences. Random access messages 220 may be transmitted from UEs 115 to base station 105-a, which may transmit random access responses 225 back to the UEs 115.

A four message random access procedure may be provided, in which random access messages correspond to established random access messages for legacy random access. Such a four message procedure may include, for example, a first message that includes a random access preamble transmitted from a UE 115 to the base station 105-a, a second message that includes a random access response from the base station 105-a that may include, for example, an uplink grant, timing advance information, and a temporary identification for use by the UE 115. A third message may be transmitted by a UE 115 that includes a connection request, and a fourth message from the base station 105-a that may include a new identification for the UE 115. According to various aspects, a two message random access procedure also may be provided, which may provide for a first random access message transmitted by a UE 115 that includes a preamble and a payload that may combine the first and third messages of the four message random access procedure. The second message of the two message random access procedure may be a random access response from base station 105-a which may provide an uplink grant and identification information, and that may combine the second and fourth messages of the four message random access procedure.

The two message random access sequence may provide latency reduction and more efficient use of uPRACH resources. Furthermore, such a sequence that transmits a payload in addition to a random access preamble in a first random access message may be relatively difficult to implement as a size of a geographic coverage area 110-a expands, but may provide for efficiencies for smaller cell sizes that may provide for reduced hypothesis detection at base station 105-a. According to some examples, a UE 115-a that may be located relatively near to the base station 105-a may transmit random access messages 220-a and receive random access responses 225-a according to a two message random access sequence. A UE 115-b that may be located relatively far from the base station 105-a, but still within geographic coverage area 110-a, may transmit random access messages 220-b and receive random access responses 225-b according to a four message random access sequence. In some examples, uPRACH information 215 may include signaling to indicate to UEs 115 when to use a four message or a two message random access sequence.

In some examples, a two message random access procedure may be used when the base station 105-a has some prior knowledge of a timing advance (TA) of a UE 115. Base station 105-a may have such knowledge, for example, in the case of a handover of a UE 115 or when a UE 115 has been unsynchronized for a duration less than a specified threshold period (e.g., shortly following a radio link failure (RLF)). For such cases, the UE 115-a may classify the UEs 115 into appropriate random access categories via signaling in uPRACH information 215. In some examples, if a UE 115 is designated for a two message random access sequence, and has one or more unsuccessful random access attempts, the UE 115 may switch to a four message random access sequence, such as after a timeout period or after a threshold number of attempts using the two message procedure. Successive attempts using the two message random access sequence may use power ramping techniques, similar to established legacy random access retransmissions. The uPRACH information 215, in some examples, may include signaling that indicates the different random access procedures, and when the different procedures are to be used. For example, the uPRACH information 215 may indicate that a two message PRACH procedure is to be used in conjunction with a handover procedure of a UE 115. Additionally or alternatively, the uPRACH information 215 may indicate a threshold time for using a two-message PRACH procedure following a loss of synchronization, and a UE 115 may, following a loss of synchronization, determine an elapsed time since prior synchronization with the base station 105-a and select the two message or four message PRACH procedure based on the elapsed time and threshold time.

The base station 105-*a*, in some examples, also may provide information indicating which of the multiple PRACH procedures are suitable for the UEs 115 based at least in part on one or more channel conditions associated with the UEs 115, which may be transmitted in uPRACH information 215. For example, such channel conditions may include TA information, a signal-to-noise ratio (SNR), a signal-to-interference-and-noise ratio (SINR), a received signal received power (RSRP) value, a signal strength associated with signals transmitted from the UE, a past loss associated with signals transmitted from the UE, or any combinations thereof. Following the receipt of a random access request, base station 105-*a* may transmit a random access response according to a ULL TTI scheme, which in some examples may use a RB assignment modified to match a ULL physical uplink shared channel (PUSCH), and may include information, in addition to uplink grant and identification information, such as transmitter power control (TPC) information, or a channel state information (CSI) request, for example.

Figure 3:
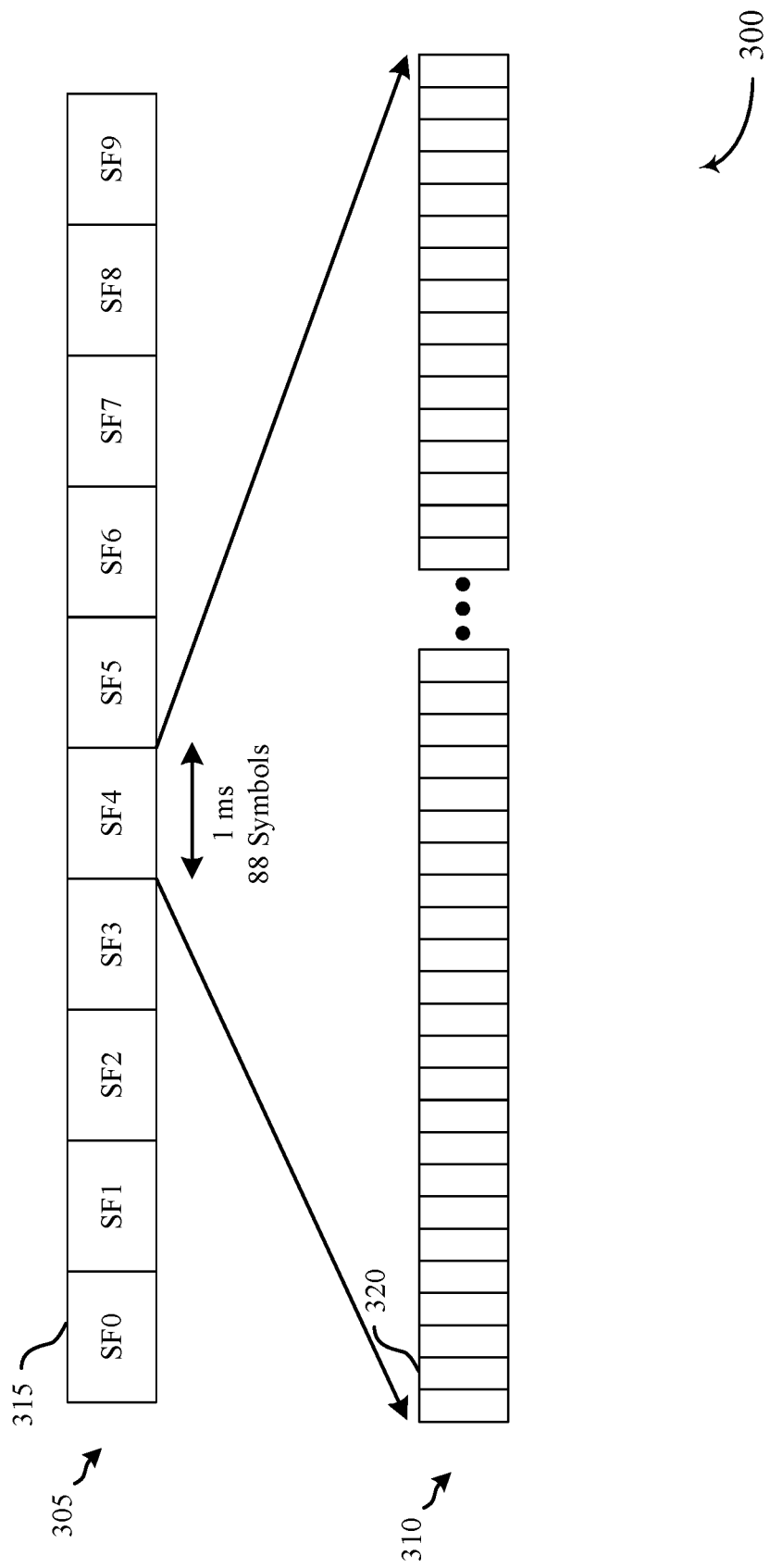
FIG. 3 illustrates examples of communications having different transmission time intervals (TTIs) in accordance with various aspects of the present disclosure.

As discussed, in various examples a wireless communications system, such as system 100 or 200 of FIG. 1 or 2, may utilize a dual TTI structure (e.g., at the subframe level and symbol-level) and also may support stand-alone ULL operation. FIG. 3 illustrates an example 300 of subframe level communications 305 and ULL or symbol level communications 310. According to various aspects of the disclosure, a UE (e.g., a UE 115 of FIG. 1 or 2) and a base station (e.g., a base station 105 of FIG. 1 or 2) may communicate using one or both of subframe level communications 305 or ULL communications 310. Subframe level communications 305 may use a number of subframes 315 that make up a radio frame, such as 10 subframes 315 that may make up a legacy LTE radio frame. Each subframe may be a 1 ms subframe, which may define a TTI for the subframe level communications 305. ULL communications 310 may include a number of symbols 320, which may define a TTI for the ULL communications 310.

As mentioned above, ULL communications 310 may be transparent to certain receiving devices, such as a legacy UE that does not support ULL communications, such that some devices may operate in the system that may employ both subframe level communications 305 and ULL communications 310. In some deployments, the numerology of such ULL symbols 320 may be consistent with numerology for a subframe 315, and in the example of FIG. 3, 88 ULL symbols 320 may correspond to a 1 ms subframe 315 duration. In such a manner, ULL-capable UEs can utilize the ULL symbols 320 while non-ULL UEs can readily ignore the symbols. A system may employ may leverage LTE numerology (e.g., timing, TTI structure, etc.) to minimize implementation effort and foster backwards compatibility. For instance, in certain systems supporting ULL may include a 15 kHz tone spacing and a CP duration of 71 μs. Such a ULL TTI structure may significantly reduce latency in a wireless system relative to latency for subframe level communications 305. For example, subframe level communications 305 may have a latency of approximately 4 ms between transmission of a subframe 315 and acknowledgment of receipt of the subframe 315, and ULL communications 310 may have a latency of approximately 300 μs between transmission of a symbol 320 and acknowledgment of receipt of the symbol 320. This represents more than an order of magnitude reduction in latency. Because a TTI for each ULL period may be a single symbol 320 period, a potential latency reduction of 12× or 14× (for extended CP and normal CP, respectively) may be realized.

According to some examples, when using a two message random access procedure, a payload may be transmitted in an initial random access message, and sufficient PRACH resources may be provided to allow for multiple UEs to concurrently seek system access. In some examples, a payload size may be set to have a maximum amount of 8 bytes, with a 16 bit CRC, thus providing a 72 bit payload. A channel bandwidth for ULL communications 310 may support 25 resource blocks per symbol 320. According to some examples, PRACH resources of 6 RBs may be provided, which may be used by a UE to transmit the random access request and payload, which may provide four UEs capability for sharing a 25RB allocation across 5 consecutive symbols 320. In some examples, the overall uPRACH duration is 5/14 msec, or 357 μs.

Figure 4:
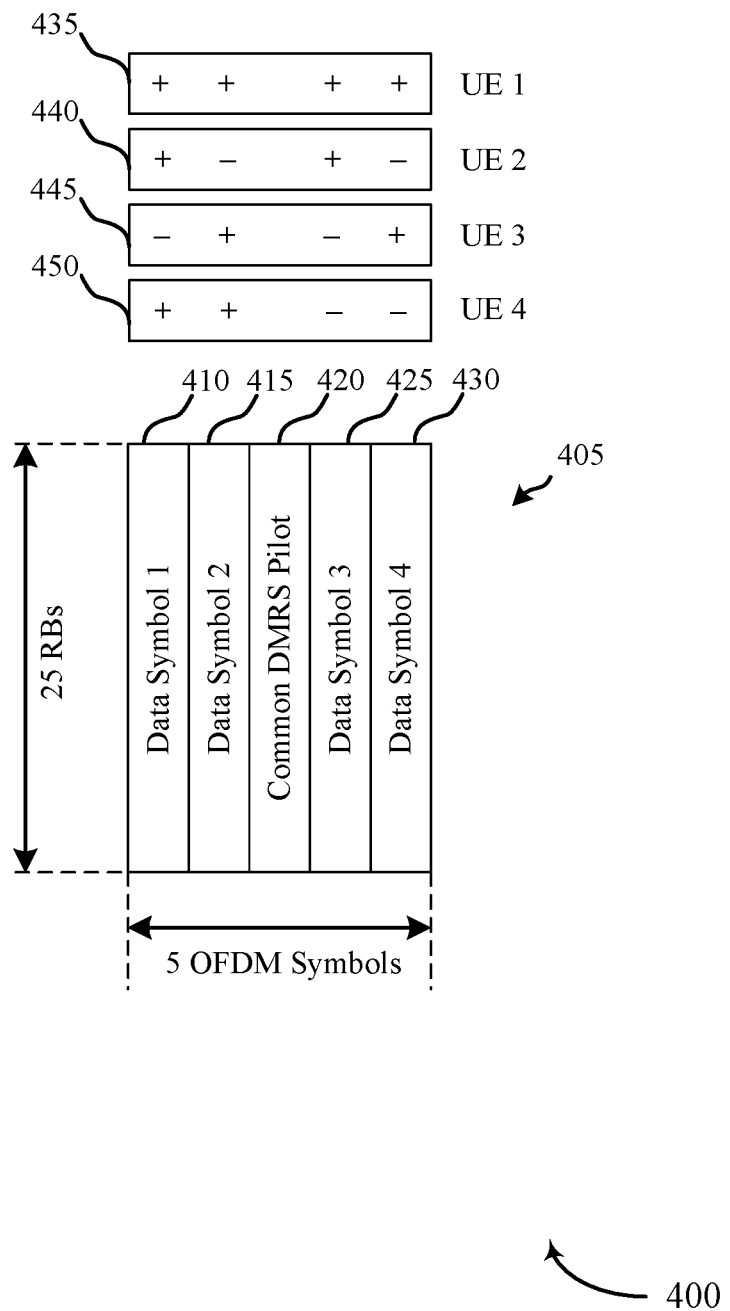
FIG. 4 illustrates an example of random access resources that may be provided for random access messages in accordance with various aspects of the present disclosure.

As mentioned, in some examples multiple UEs may have capability for sharing a 25 RB allocation across a number of ULL symbols. FIG. 4 illustrates an example 400 of random access resources 405 that may be provided for random access messages in accordance with various aspects of the present disclosure. According to various aspects of the disclosure, a base station (e.g., a base station 105 of FIG. 1 or 2) may configure five OFDM symbols in a PRACH, namely a first data symbol 410, a second data symbol 415, a common demodulation reference signal (DMRS) pilot symbol 420, a third data symbol 425, and a fourth data symbol 430. Symbols 410-430 may occupy 25 RBs of channel bandwidth. A number of UEs (e.g., UEs 115 of FIG. 1 or 2) may use random access resources 405 for accessing a base station. In some examples, UEs may transmit random access messages using signals encoded using mutually orthogonal codes (e.g., Walsh codes). In the example of FIG. 4, a length 4 Walsh spreading sequence is used across the four data symbols 410, 415, 425, and 430. Resources for a first UE may employ first Walsh spreading 435 across the data symbols 410-430, resources for a second UE may employ second Walsh spreading 440 across the data symbols 410-415 and 425-430, resources for a third UE may employ third Walsh spreading 445 across the data symbols 410-430, and resources for a fourth UE may employ fourth Walsh spreading 450 across the data symbols 410-430.

In the example of FIG. 4, the first data symbol 410 and the second data symbol 415 are located on one side of the common DMRS pilot symbol 420, with the third data symbol 425 and the fourth data symbol 430 located on the other side of the common DMRS pilot symbol 420. Such a configuration provides a symmetric allocation of subsets of OFDM symbols symmetrically located on opposite sides of the reference signal resources for the common DMRS pilot symbol 420, and may provide efficient sharing of the common DMRS pilot symbol 420 across the data symbols 410-415 and 425-430. Although five symbols 410-430 are illustrated in FIG. 4, it will be readily understood that such techniques may be applied to different numbers of symbols that may be allocated for PRACH resources.

Because the common DMRS pilot symbol 420 is shared by different data symbols 410-415 and 425-430, various examples may provide that a UE may select a cyclic shift for the common DMRS pilot symbol 420. In some examples, the cyclic shift to be used for the pilot transmission by a UE may be configured to correspond to a particular Walsh spreading sequence 435-450. For example, a one-to-one mapping between cyclic shifts and Walsh spreading sequences may be provided in configuration information (e.g., uPRACH information 215 of FIG. 2), or may be specified in a standard. When a UE determines that a payload-based random access procedure (e.g., a two message random access procedure) is to be performed, the UE may identify the payload, generate a random access message that includes the payload, and may select resources for transmitting the random access message according to available resources and the spreading code. The resources that are to be used by a UE in such instances may be signaled to a UE, or may be randomly selected by the UE, for example.

Figure 5:
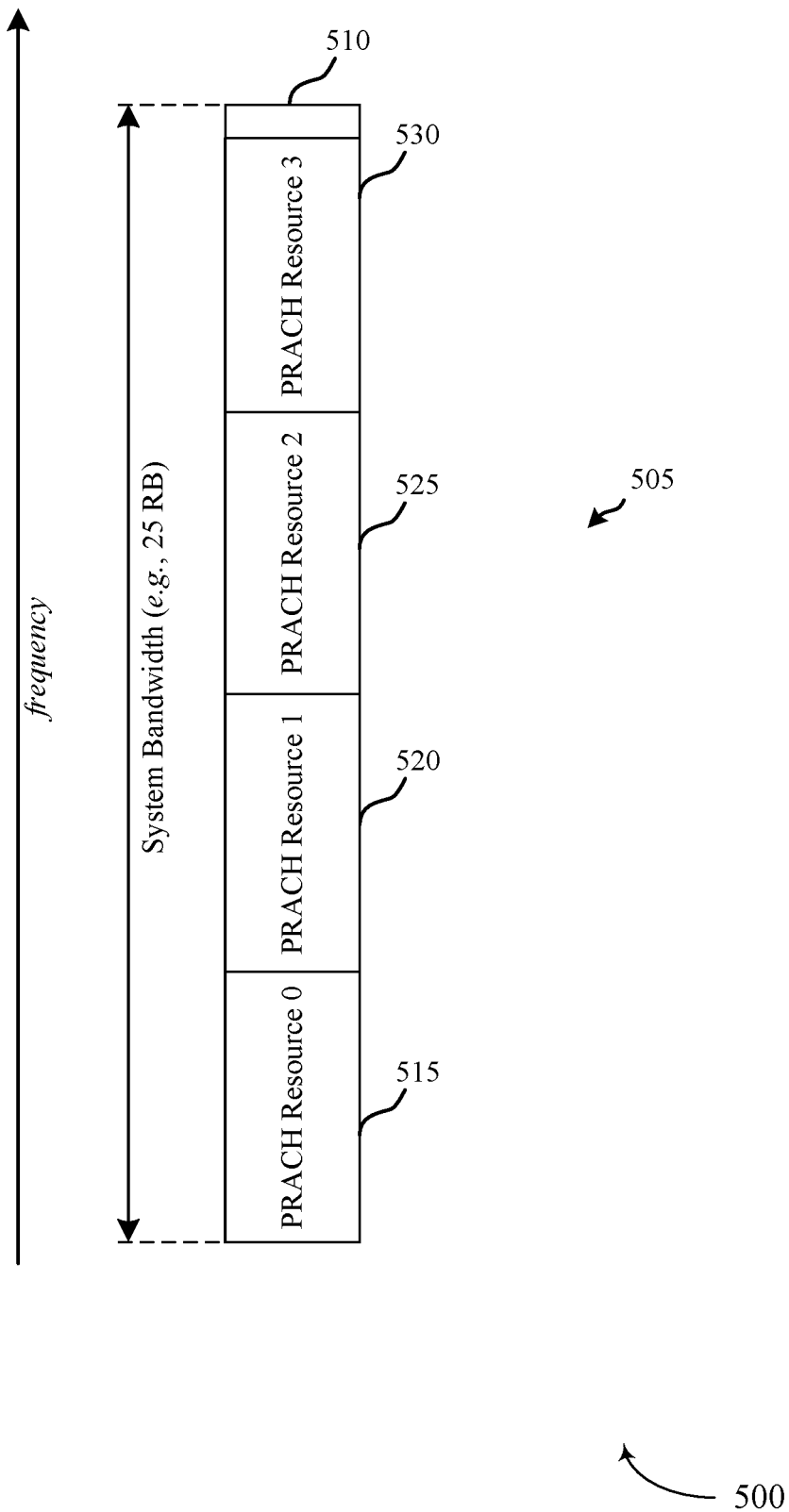
FIG. 5 illustrates an example of random access resources that may be provided for random access messages in accordance with various aspects of the present disclosure.

As mentioned above, in some examples UEs (e.g., UEs 115 of FIG. 1 or 2) may use a four message signature-based PRACH procedure for network access with a base station (e.g., a base station 105 of FIG. 1 or 2). FIG. 5 illustrates an example 500 of random access resources 505 that may be provided for four message random access procedures in accordance with various aspects of the present disclosure. According to various aspects of the disclosure, a base station (e.g., a base station 105 of FIG. 1 or 2) may configure an OFDM symbol 510 to include PRACH resources. In some deployments, ULL communications may be configured to include a physical uplink shared channel (PUSCH) having channel partitioning in 5 MHz blocks, which may provide 25 RBs for a ULL symbol. Furthermore, four message random access resources may occupy 6 RBs. Thus, the PRACH resources may be signaled to UEs, which may then rate match around the PRACH resources with PUSCH transmissions. Such deployments may require additional control channel signaling and overhead to provide information on the PRACH resources, however.

In other deployments, such as illustrated in FIG. 5, PRACH resources may be stacked in frequency to more fully occupy available resources within a duration of symbol 510. In the example of FIG. 5, a first PRACH resource 515, a second PRACH resource 520, a third PRACH resource 525, and a fourth PRACH resource 530 each have 6 RBs and are stacked in frequency to occupy 24 RBs, which is a significant portion the system bandwidth of 25 RBs. Signaling to indicate PRACH resources may then be provided that indicates the OFDM symbol 510 and number of PRACH resources stacked using frequency resources of the OFDM symbol 510. In further examples, resources for four message random access sequences may be selected based on a preamble that is provided for random access requests using such a random access sequence. In some examples, a preamble may be provided that has a relatively short duration relative to legacy random access preambles, and that may be useful for a ULL deployment targeting a small cell configuration. For example, a time duration of such a preamble may be selected to be in the range of range of 2 symbols to 7 symbols (or one slot of a 1 ms legacy subframe). In some examples, the duration of the preamble may be selected to provide adequate preambles for, for example, 1 kilometer deployments. Such configuration for PRACH resources may be signaled to UEs in a manner similarly as discussed above.

Figure 6:
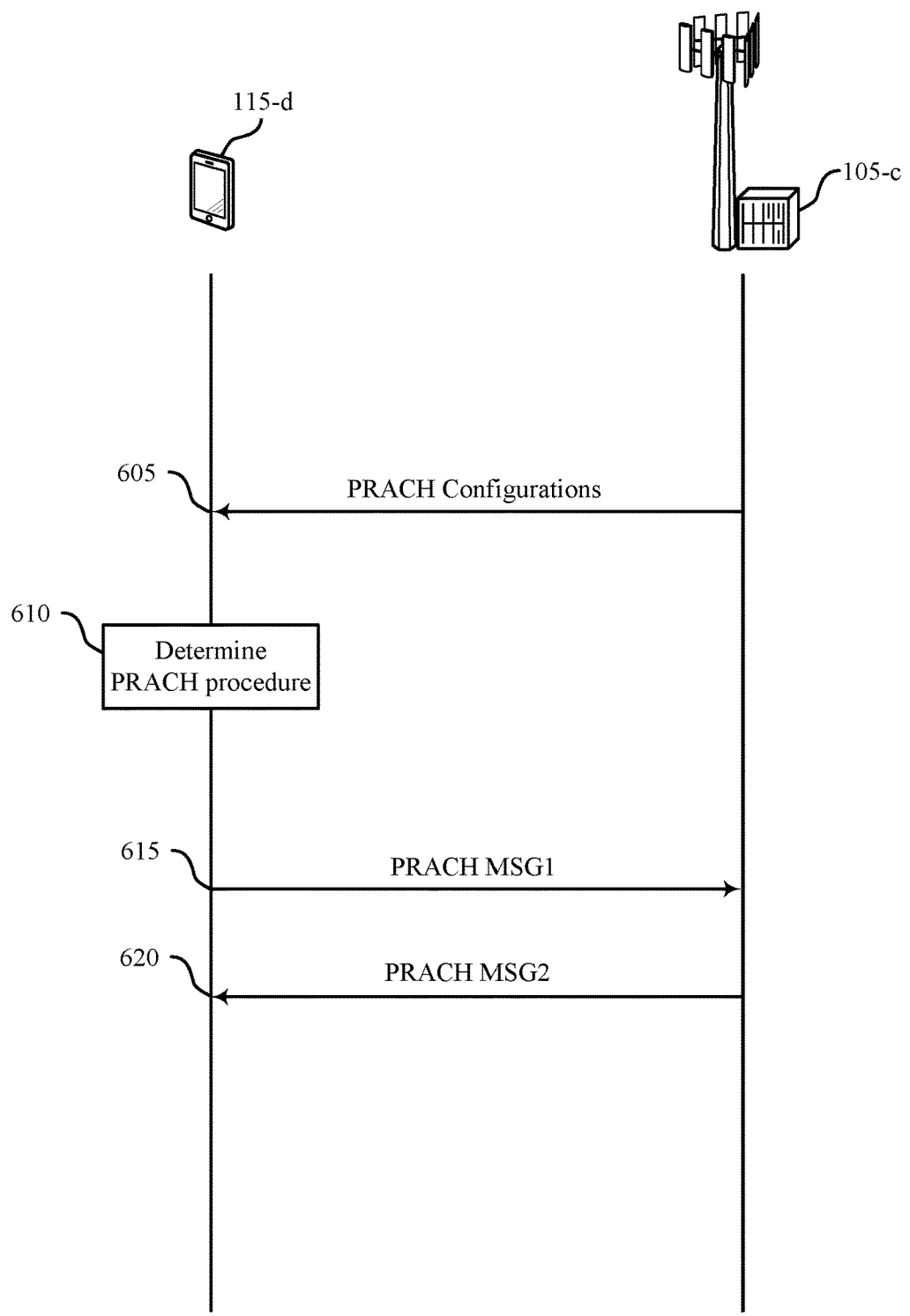
FIG. 6 illustrates an example of a process flow for random access in accordance with various aspects of the present disclosure.

FIG. 6 illustrates an example of a process flow 600 for random access in low latency wireless communications in accordance with various aspects of the present disclosure. Process flow 600 may include a UE 115-c, which may be an example of a UE 115 described above with reference to FIGS. 1-2. Process flow 600 may also include a base station 105-b, which may be an example of a base station 105 described above with reference to FIGS. 1-2. Although described in reference to a base station 105 and UE 115, the steps of process flow 600 may be performed by any set of wireless devices that may provide random access in low latency wireless communications.

At step 605, base station 105-b may transmit PRACH configurations to UE 115-c. Such PRACH configurations may be determined by the base station 105-b in a manner similarly as discussed above with respect to FIGS. 1-5. In some examples, the PRACH configurations may include configurations and associated PRACH resources for multiple different PRACH procedures, such as a two message PRACH procedure or a four message PRACH procedure, as discussed above. At step 610, the UE 115-c may determine a PRACH procedure from multiple available PRACH procedures to be used in network access. Such a PRACH procedure may be determined based on a number of factors, such as signaling from the base station 105-b, whether the access is necessary as part of a handover procedure, or an elapsed time since a previous synchronization with base station 105-b. In the example of FIG. 6, the UE 115-c may determine that a two message PRACH procedure is to be used for network access.

At step 615 the UE 115-c may transmit (and base station 105-b may receive) a first PRACH message (PRACH MSG1), that may include a preamble and a payload, similarly as discussed above with respect to FIGS. 1-5. At step 620, the base station 105-b may transmit (and UE 115-c may receive) a second PRACH message (PRACH MSG2). The second PRACH message may include an uplink grant and identifier for the UE 115-c, similarly as discussed above with respect to FIGS. 1-5. In the event that UE 115-c does not receive the second PRACH message at step 620, the UE 115-c may retransmit the first PRACH message, which may be at a higher transmit power, and wait for the second PRACH message. In the event that the UE 115-c does not receive the second PRACH message within a timeout period or after a number of retransmissions, the UE 115-c may initiate a different PRACH procedure (e.g., a four message PRACH procedure). In the event that there was a collision between the transmission of the first PRACH message at step 615 and a PRACH transmission of a different UE, the UE 115-c may wait for a backoff period and attempt to retransmit the first PRACH message.

Figure 7:
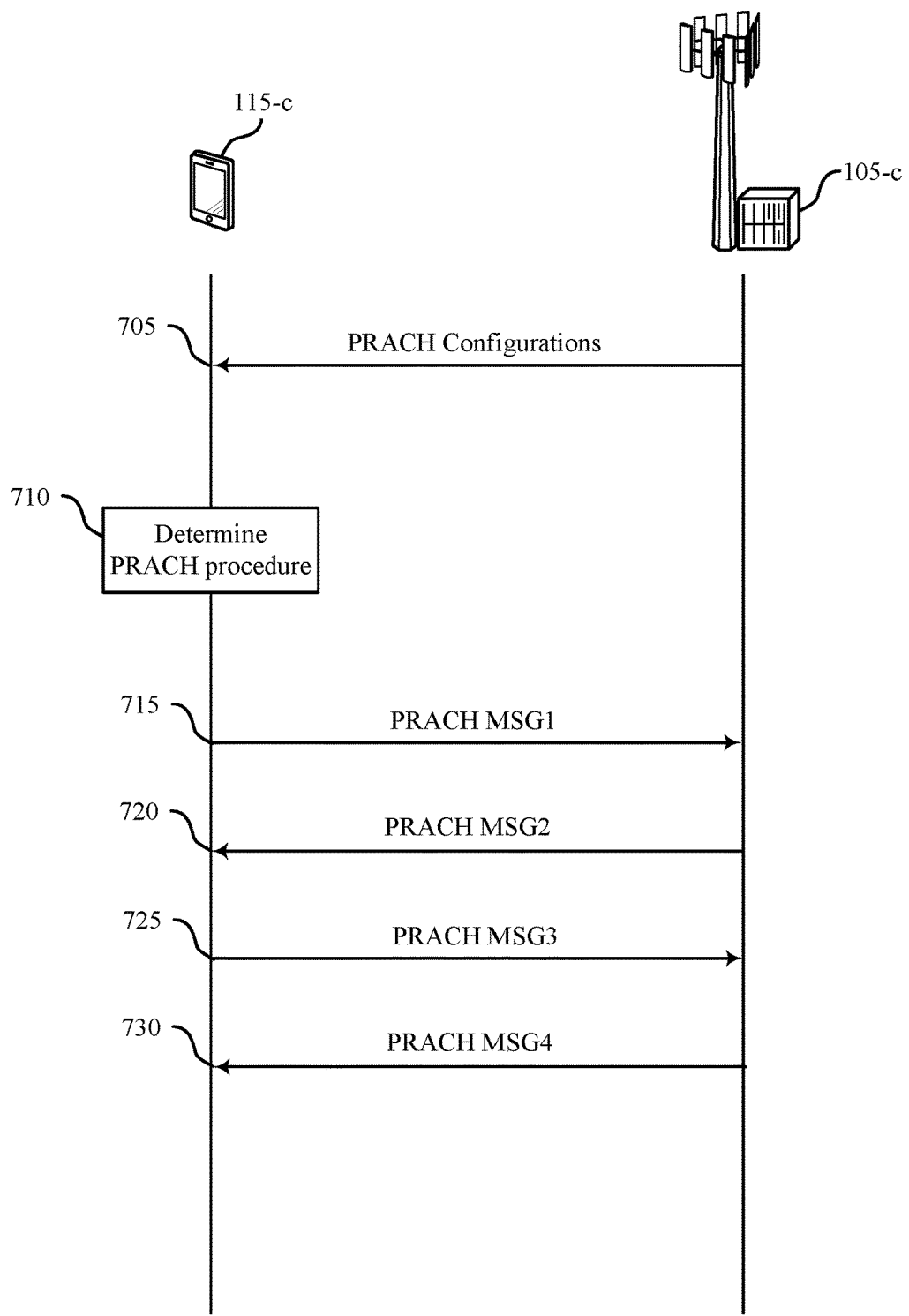
FIG. 7 illustrates an example of a process flow for random access in accordance with various aspects of the present disclosure.

FIG. 7 illustrates an example of a process flow 700 for random access in low latency wireless communications in accordance with various aspects of the present disclosure. Process flow 700 may include a UE 115-d, which may be an example of a UE 115 described above with reference to FIG. 1-2 or 6. Process flow 700 may also include a base station 105-c, which may be an example of a base station 105 described above with reference to FIG. 1-2 or 6. Although described in reference to a base station 105 and UE 115, the steps of process flow 700 may be performed by any set of wireless devices that may provide random access in low latency wireless communications.

At step 705, base station 105-c may transmit PRACH configurations to UE 115-d. Such PRACH configurations may be determined by the base station 105-c in a manner similarly as discussed above with respect to FIGS. 1-6. In some examples, the PRACH configurations may include configurations and associated PRACH resources for multiple different PRACH procedures, such as a two message PRACH procedure or a four message PRACH procedure, as discussed above. At step 710, the UE 115-d may determine a PRACH procedure from multiple available PRACH procedures to be used in network access. Such a PRACH procedure may be determined based on a number of factors, such as signaling from the base station 105-c, whether the access is necessary as part of a handover procedure, an elapsed time since a previous synchronization with base station 105-c, or prior failed access attempts using a different PRACH procedure. In the example of FIG. 7, the UE 115-d may determine that a four message PRACH procedure is to be used for network access.

At step 715 the UE 115-d may transmit (and base station 105-c may receive) a first PRACH message (PRACH MSG1), that may include a random access preamble, similarly as discussed above with respect to FIGS. 1-5. At step 720, the base station 105-c may transmit (and UE 115-d may receive) a second PRACH message (PRACH MSG2). The second PRACH message may include an uplink grant, TA information, and a temporary identifier for the UE 115-d, similarly as discussed above with respect to FIGS. 1-5. At step 725, the UE 115-d may transmit (and base station 105-c may receive) a third PRACH message (PRACH MSG3). The third PRACH message may include a connection request. At step 730, the base station 105-c may transmit (and UE 115-d may receive) a fourth PRACH message (PRACH MSG4) that may include a new identification for the UE 115. In the event that UE 115-d does not receive the second PRACH message at step 720 or fourth PRACH message at step 730, the UE 115-d may retransmit the first PRACH message, which may be at a higher transmit power, and wait for the second PRACH message.

Figure 8:
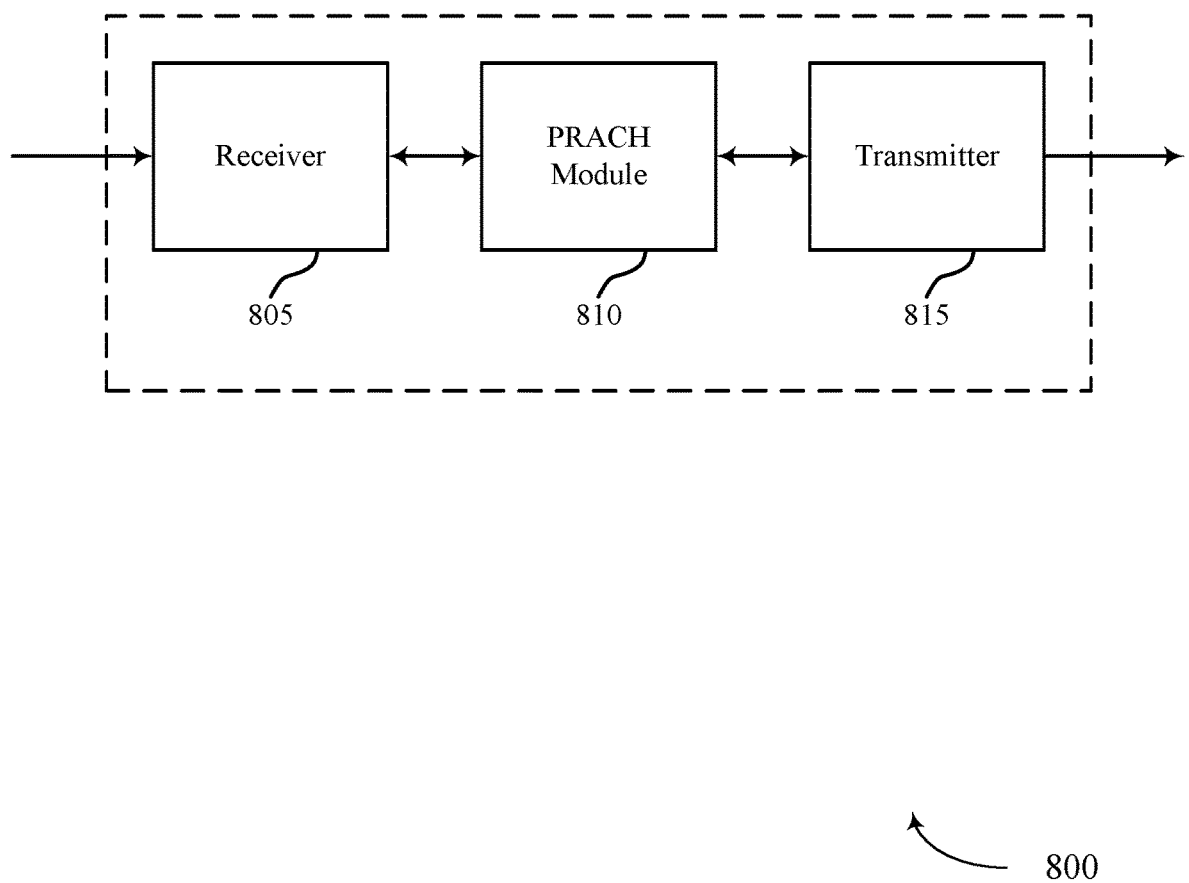
FIG. 8 shows a block diagram of a device configured for random access in low latency wireless communications in accordance with various aspects of the present disclosure.

FIG. 8 shows a block diagram of a wireless device 800 configured for random access in low latency wireless communications in accordance with various aspects of the present disclosure. Wireless device 800 may be an example of aspects of a UE 115 or a base station 105 described with reference to FIGS. 1-7. Wireless device 800 may include a receiver 805, a PRACH module 810, or a transmitter 815. Wireless device 800 may also include a processor. Each of these components may be in communication with one another.

The receiver 805 may receive information such as packets, user data, or control information associated with various information channels (e.g., control channels, data channels, random access requests, or PRACH information, etc.). Information may be passed on to the PRACH module 810, and to other components of wireless device 800. In some examples, the receiver 805 may receive PRACH information related to available PRACH procedures and resources. In some examples, the receiver 805 may receive a random access request according to a signaled PRACH procedure.

The PRACH module 810 may identify different PRACH procedures that may be used for random access sequences. In some examples, the PRACH module 810, in combination with, e.g., the transmitter 815, may transmit an indication of available PRACH procedures and PRACH resources, in a manner similarly as discussed above with respect to FIGS. 1-7. In other examples, the PRACH module 810, in combination with, e.g., the receiver 805, may receive PRACH information indicating available PRACH procedures and may perform selection of a PRACH procedure, along with generation of PRACH messages for use in accessing a network, in a manner similarly as discussed above with respect to FIGS. 1-7.

The transmitter 815 may transmit signals received from other components of wireless device 800. In some examples, the transmitter 815 may be collocated with the receiver 805 in a transceiver module. The transmitter 815 may include a single antenna, or it may include a several antennas.

Figure 9:
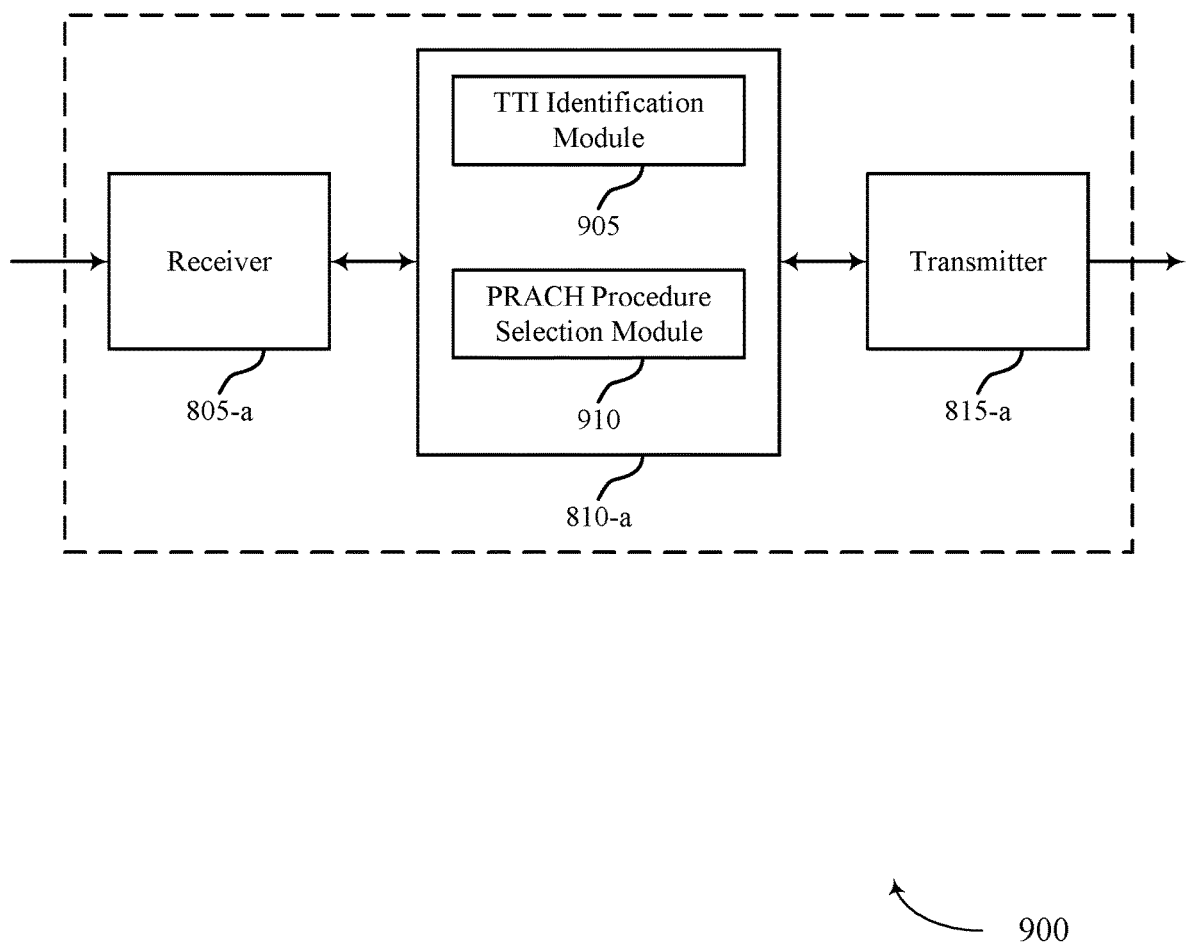
FIG. 9 shows a block diagram of a device configured for random access in low latency wireless communications in accordance with various aspects of the present disclosure.

FIG. 9 shows a block diagram of a wireless device 900 for random access in low latency wireless communications in accordance with various aspects of the present disclosure. Wireless device 900 may be an example of aspects of a wireless device 800 or a UE 115 or a base station 105 described with reference to FIGS. 1-7. Wireless device 900 may include a receiver 805-a, a PRACH module 810-a, or a transmitter 815-a. Wireless device 900 may also include a processor. Each of these components may be in communication with one another. The PRACH module 810-a may also include a TTI identification module 905, and a PRACH procedure selection module 910.

The receiver 805-a may receive information which may be passed on to PRACH module 810-a, and to other components of wireless device 900. The PRACH module 810-a may perform the operations described above with reference to FIG. 8. The transmitter 815-a may transmit signals received from other components of wireless device 900.

The TTI identification module 905 may identify a TTI that is to be used for communications, such as a ULL symbol level TTI or a subframe level TTI, as described above with reference to FIGS. 1-7. The PRACH procedure selection module 910 may identify available PRACH procedures and may select one of the PRACH procedures for use in random access, as described above with reference to FIGS. 1-7.

Figure 10:
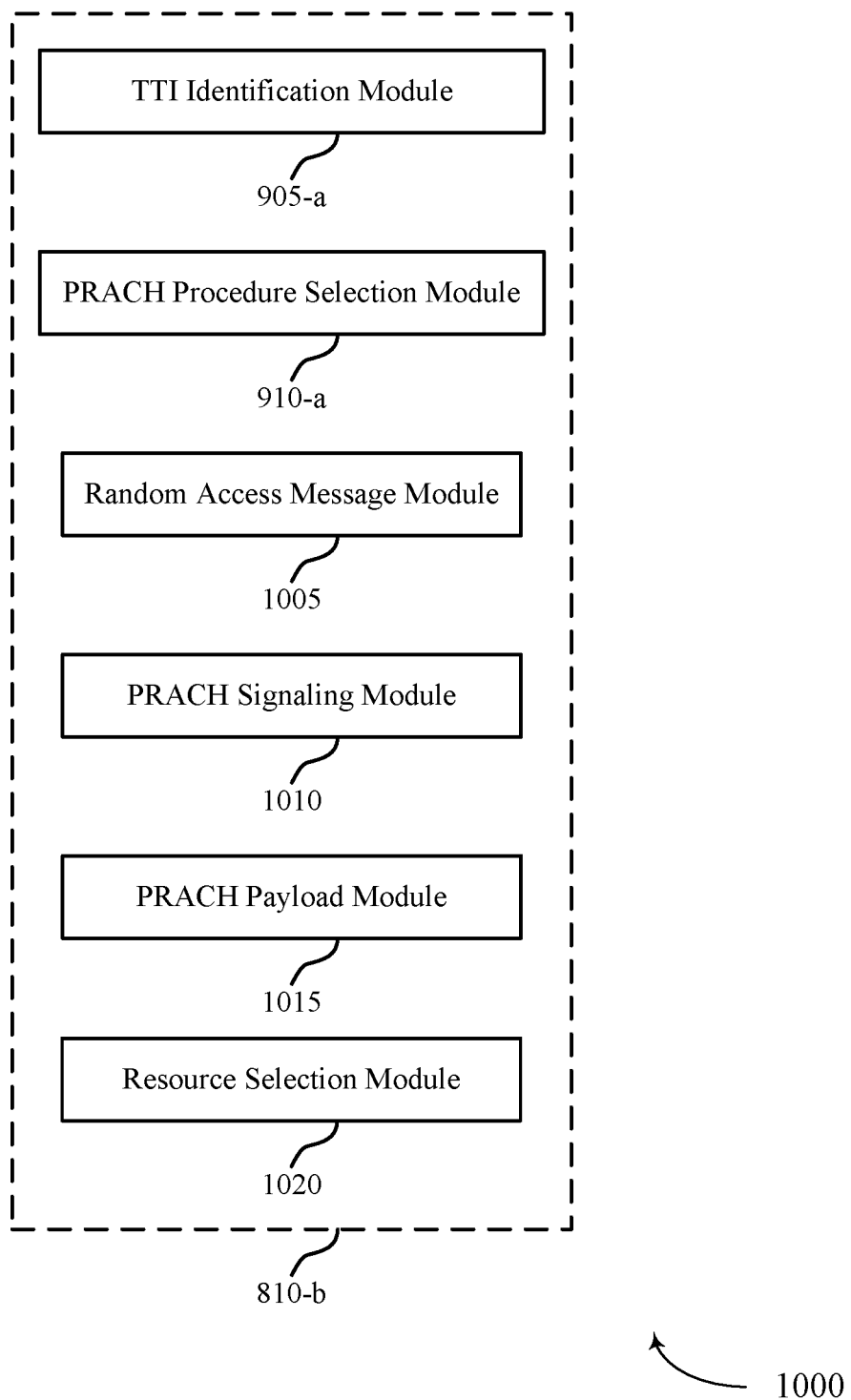
FIG. 10 shows a block diagram of a physical random access channel module configured for random access in low latency wireless communications in accordance with various aspects of the present disclosure.

FIG. 10 shows a block diagram 1000 of a PRACH module 810-b which may be a component of a wireless device 800 or a wireless device 900 for random access in low latency wireless communications in accordance with various aspects of the present disclosure. The PRACH module 810-b may be an example of aspects of a PRACH module 810 described with reference to FIGS. 8-9. The PRACH module 810-b may include a TTI identification module 905-a, and a PRACH procedure selection module 910-a. Each of these modules may perform the functions described above with reference to FIG. 9. The PRACH module 810-b may also include a random access message module 1005, a PRACH signaling module 1010, a PRACH payload module 1015, and a resource selection module 1020. The various modules of PRACH module 810-b may be in communication with one another.

The random access message module 1005 may configure and format random access messages that may be transmitted according to a random access procedure, as described above with reference to FIGS. 1-7. The PRACH signaling module 1010 may provide signaling for available PRACH configurations or PRACH resources, as described above with reference to FIGS. 1-7. In some examples, the PRACH signaling module 1010 may transmit PRACH signaling related to multiple available PRACH procedures, or reference signal resources associated with PRACH resources, as described above with reference to FIGS. 1-7.

The PRACH payload module 1015 may configure or receive a PRACH payload that is transmitted in a PRACH message, as described above with reference to FIGS. 1-7. The PRACH payload module 1015 may also provide information related to spreading of a PRACH payload (e.g., Walsh spreading) across available PRACH resources, as described above with reference to FIGS. 1-7. The resource selection module 1020 may determine and select PRACH resources to be used for PRACH procedures, as described above with reference to FIGS. 1-7.

The components of wireless device 800, wireless device 900, or PRACH module 810-b may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 11:
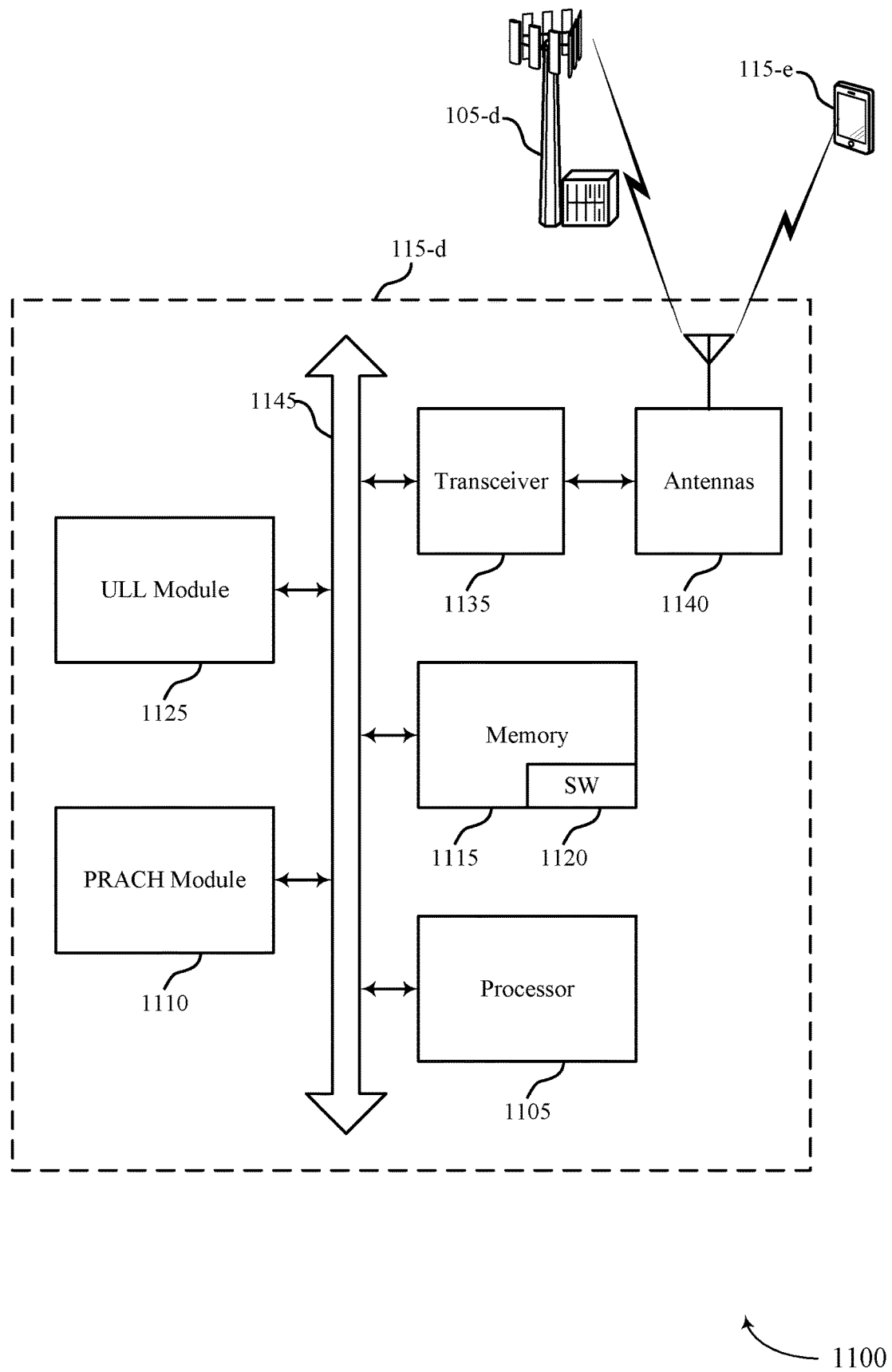
FIG. 11 illustrates a block diagram of a system including a UE configured for random access in low latency wireless communications in accordance with various aspects of the present disclosure.

FIG. 11 shows a diagram of a system 1100 including a UE configured for random access in low latency wireless communications in accordance with various aspects of the present disclosure. System 1100 may include UE 115-d, which may be an example of a UE 115, a wireless device 800, or a wireless device 900 described above with reference to FIGS. 1-9. UE 115-d may include a PRACH module 1110, which may be an example of a PRACH module 810 described with reference to FIGS. 8-10. In some examples, UE 115-d may include a ULL module 1125, which may manage aspects of ULL communications for UE 115-d in addition to the PRACH related aspects managed by PRACH module 1110. In some examples, PRACH module 1110 and ULL module 1125 may be co-located within a same module. UE 115-d may also include components for bi-directional voice and data communications including components for transmitting communications and components for receiving communications. For example, UE 115-d may communicate bi-directionally with base station 105-d or UE 115-e.

UE 115-d may also include a processor 1105, and memory 1115 (including software (SW) 1120), a transceiver module 1135, and one or more antenna(s) 1140, each of which may communicate, directly or indirectly, with one another (e.g., via buses 1145). The transceiver module 1135 may communicate bi-directionally, via the antenna(s) 1140 or wired or wireless links, with one or more networks, as described above. For example, the transceiver module 1135 may communicate bi-directionally with a base station 105 or another UE 115. The transceiver module 1135 may include a modem to modulate the packets and provide the modulated packets to the antenna(s) 1140 for transmission, and to demodulate packets received from the antenna(s) 1140. While UE 115-d may include a single antenna 1140, UE 115-d may also have multiple antennas 1140 capable of concurrently transmitting or receiving multiple wireless transmissions.

The memory 1115 may include random access memory (RAM) and read only memory (ROM). The memory 1115 may store computer-readable, computer-executable software/firmware code 1120 including instructions that, when executed, cause the processor 1105 to perform various functions described herein (e.g., ULL communications, PRACH procedures, etc.). Alternatively, the software/firmware code 1120 may not be directly executable by the processor 1105 but cause a computer (e.g., when compiled and executed) to perform functions described herein. The processor 1105 may include an intelligent hardware device, (e.g., a central processing unit (CPU), a microcontroller, an ASIC, etc.)

Figure 12:
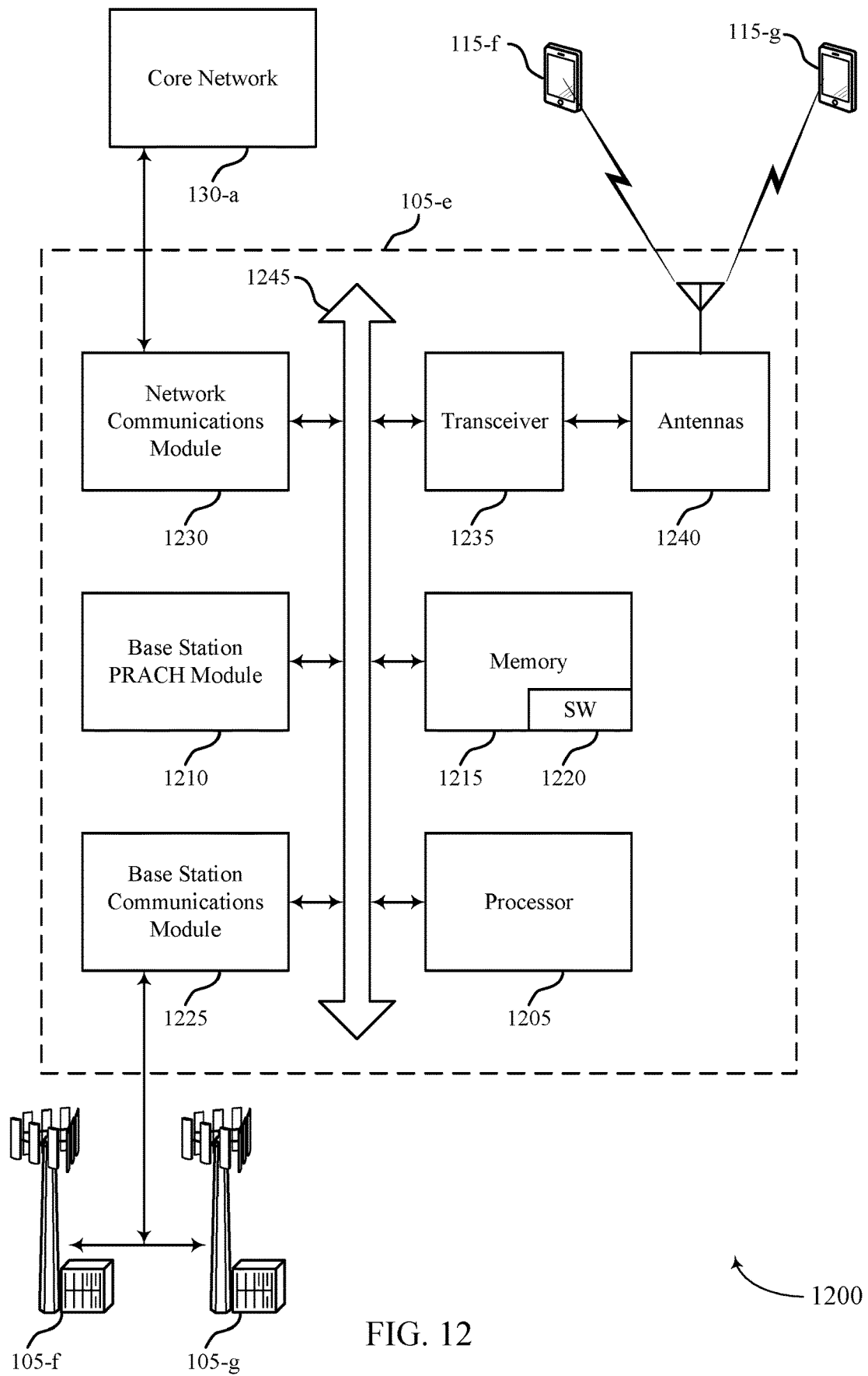
FIG. 12 illustrates a block diagram of a system including a base station configured for random access in low latency wireless communications in accordance with various aspects of the present disclosure.

FIG. 12 shows a diagram of a system 1200 including a base station 105-e configured for random access in low latency wireless communications in accordance with various aspects of the present disclosure. System 1200 may include base station 105-e, which may be an example of a base station 105, a wireless device 800, or a wireless device 900 described above with reference to FIGS. 1-9. Base station 105-e may include a base station PRACH module 1210, which may be an example of a PRACH module 810 described with reference to FIGS. 8-10. Base station 105-e may also include components for bi-directional voice and data communications including components for transmitting communications and components for receiving communications. For example, base station 105-e may communicate bi-directionally with UE 115-f or UE 115-g.

In some cases, base station 105-e may have one or more wired backhaul links. Base station 105-e may have a wired backhaul link (e.g., S1 interface, etc.) to the core network 130. Base station 105-e may also communicate with other base stations 105, such as base station 105-f and base station 105-g via inter-base station backhaul links (e.g., an X2 interface). Each of the base stations 105 may communicate with UEs 115 using the same or different wireless communications technologies. In some cases, base station 105-e may communicate with other base stations such as 105-f or 105-g utilizing base station communication module 1225. In some examples, base station communication module 1225 may provide an X2 interface within an LTE/LTE-A wireless communication network technology to provide communication between some of the base stations 105. In some examples, base station 105-e may communicate with other base stations through core network 130. In some cases, base station 105-e may communicate with the core network 130 through network communications module 1230.

The base station 105-e may include a processor 1205, memory 1215 (including software (SW) 1220), transceiver 1235, and antenna(s) 1240, which each may be in communication, directly or indirectly, with one another (e.g., over bus system 1245). The transceiver 1235 may be configured to communicate bi-directionally, via the antenna(s) 1240, with the UEs 115, which may be multi-mode devices. The transceiver 1235 (or other components of the base station 105-d) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-e may include multiple transceiver modules 1235, each with one or more associated antennas 1240. The transceiver module may be an example of a combined receiver 805 and transmitter 815 of FIG. 8.

The memory 1215 may include RAM and ROM. The memory 1215 may also store computer-readable, computer-executable software code 1220 containing instructions that are configured to, when executed, cause the processor 1205 to perform various functions described herein (e.g., ULL communications, PRACH selection and communications, etc.). Alternatively, the software code 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communication module 1225 may manage communications with other base stations 105. The communications management module may include a controller or scheduler for controlling communications with UEs 115 in cooperation with other base stations 105. For example, the base station communication module 1225 may coordinate scheduling for transmissions to UEs 115 for various interference mitigation techniques such as beamforming or joint transmission.

Figure 13:
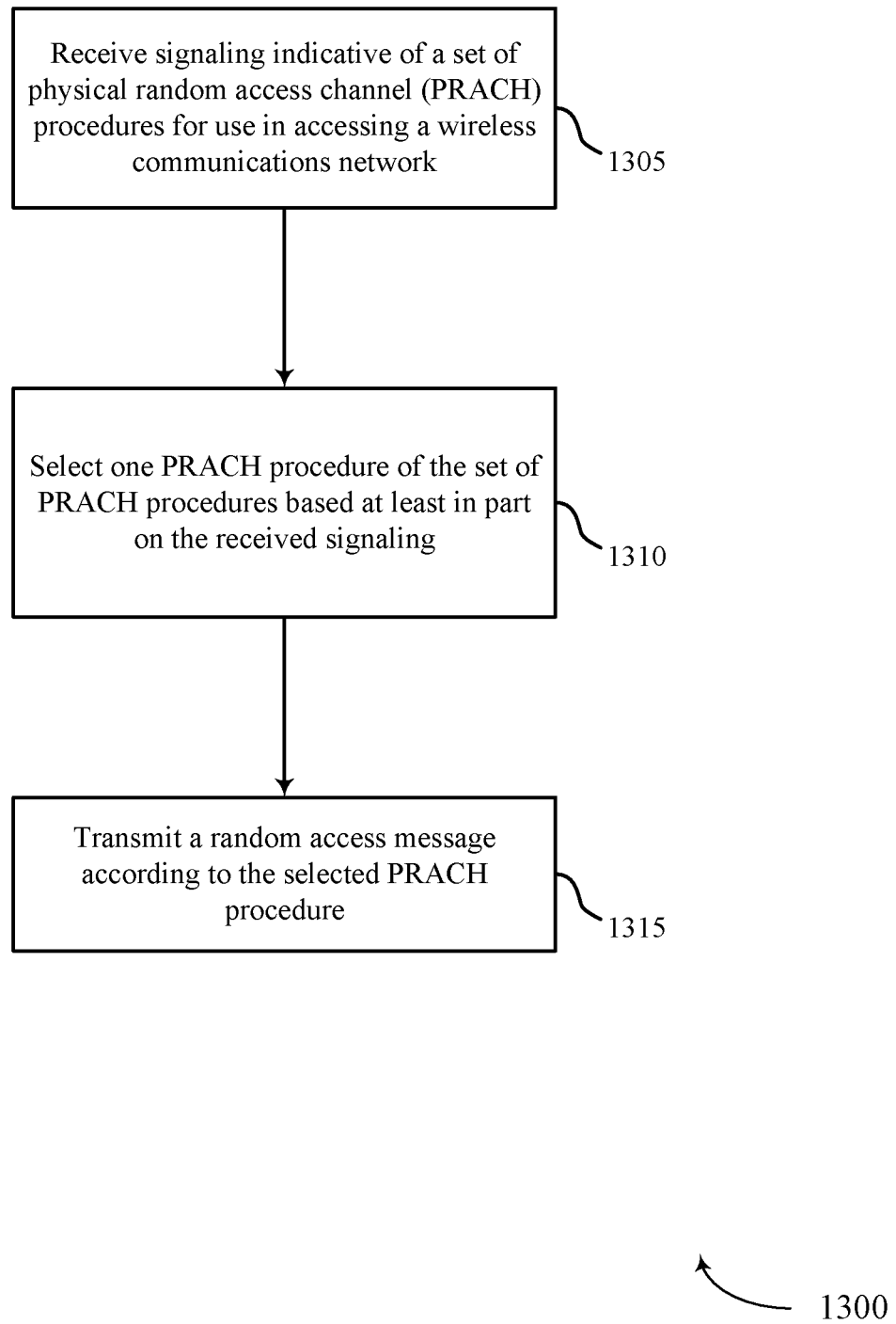
FIG. 13 shows a flowchart illustrating a method for random access in low latency wireless communications in accordance with various aspects of the present disclosure.

FIG. 13 shows a flowchart illustrating a method 1300 for random access in low latency wireless communications in accordance with various aspects of the present disclosure. The operations of method 1300 may be implemented by a wireless device, including a UE 115, or its components, which may include wireless device 800 or wireless device 900, as described with reference to FIGS. 1-11. For example, the operations of method 1300 may be performed by the PRACH module 810 as described with reference to FIGS. 8-10. In some examples, the wireless device may execute a set of codes to control the functional elements to perform the functions described below. Additionally or alternatively, the wireless device may perform aspects the functions described below using special-purpose hardware.

At block 1305, the wireless device may receive signaling indicative of a set of physical random access channel (PRACH) procedures for use in accessing a wireless communications network, as described above with reference to FIGS. 1-7. In certain examples, the operations of block 1305 may be performed by the receiver 805 and PRACH module 810 as described above with reference to FIGS. 8-10 or by antennas 1140, transceiver 1135, and PRACH module 1110 of FIG. 11.

At block 1310, the wireless device may select one PRACH procedure of the set of PRACH procedures based at least in part on the received signaling, as described above with reference to FIGS. 1-7. In certain examples, the operations of block 1310 may be performed by the PRACH procedure selection module 910 as described above with reference to FIGS. 9-10.

At block 1315, the wireless device may transmit a random access message according to the selected PRACH procedure as described above with reference to FIGS. 1-7. In certain examples, the operations of block 1315 may be performed by the transmitter 815 and PRACH module 810 of FIGS. 8-10, or may be performed by antennas 1140, transceiver 1135, and PRACH module 1110 of FIG. 11.

Figure 14:
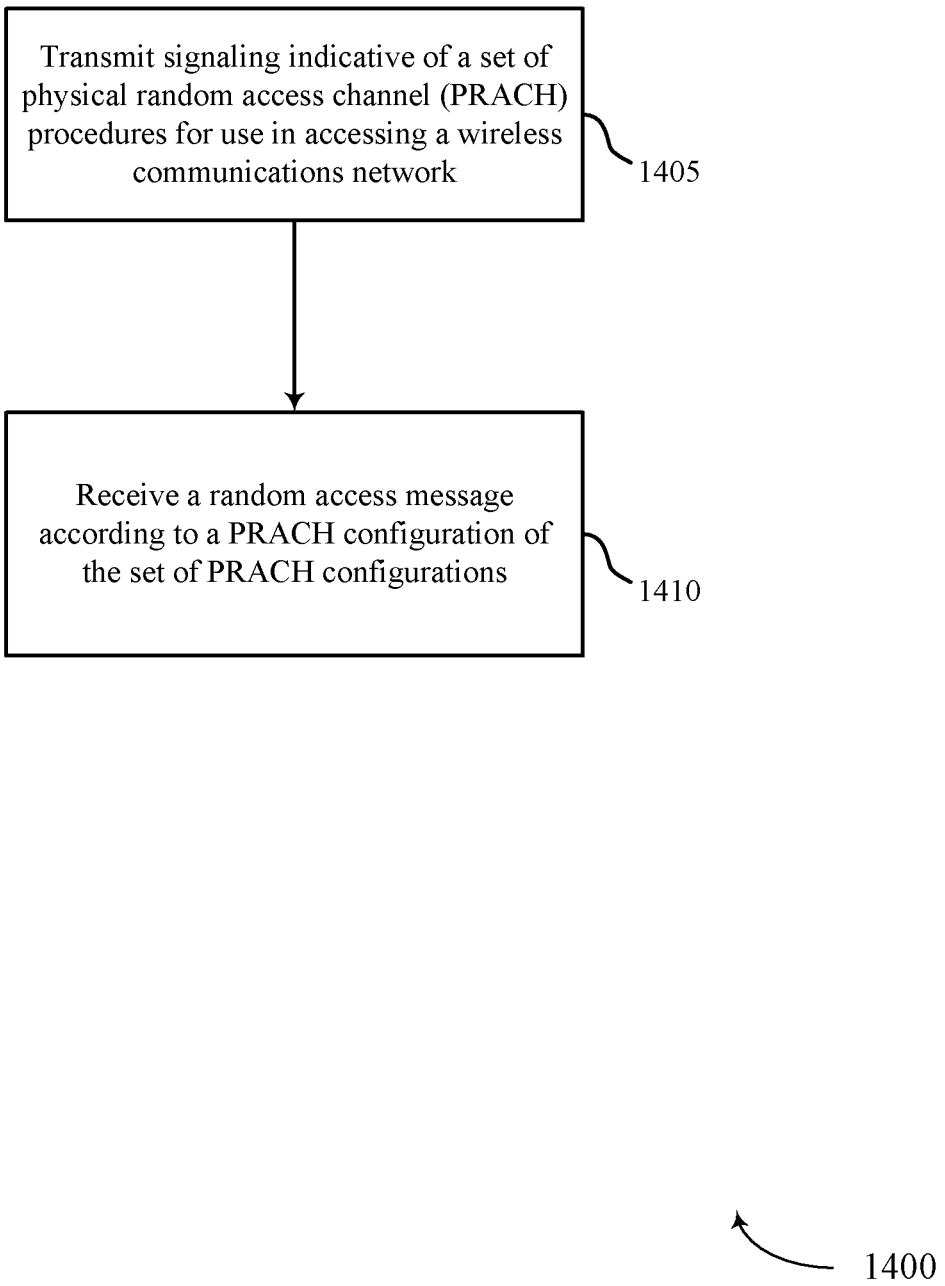
FIG. 14 shows a flowchart illustrating a method for random access in low latency wireless communications in accordance with various aspects of the present disclosure.

FIG. 14 shows a flowchart illustrating a method 1400 for random access in low latency wireless communications in accordance with various aspects of the present disclosure. The operations of method 1400 may be implemented by a wireless device, including a base station 105, or its components, which may include wireless device 800 or wireless device 900, as described with reference to FIG. 1-10 or 12. For example, the operations of method 1400 may be performed by the PRACH module 810 as described with reference to FIGS. 8-10. In some examples, the wireless device may execute a set of codes to control the functional elements to perform the functions described below. Additionally or alternatively, the wireless device may perform aspects the functions described below using special-purpose hardware.

At block 1405, the wireless device may transmit signaling indicative of a set of physical random access channel (PRACH) procedures for use in accessing a wireless communications network, as described above with reference to FIGS. 1-7. In certain examples, the operations of block 1405 may be performed by the transmitter 815 and PRACH module 810 as described above with reference to FIGS. 8-10 or by antennas 1240, transceiver 1235, and base station PRACH module 1210 of FIG. 12.

At block 1410, the wireless device may receive a random access message according to a PRACH configuration of the set of PRACH configurations, as described above with reference to FIGS. 1-7. In certain examples, the operations of block 1410 may be performed by the receiver 805 and PRACH module 810 of FIGS. 8-10, or may be performed by antennas 1240, transceiver 1235, and base station PRACH module 1210 of FIG. 12.

Figure 15:
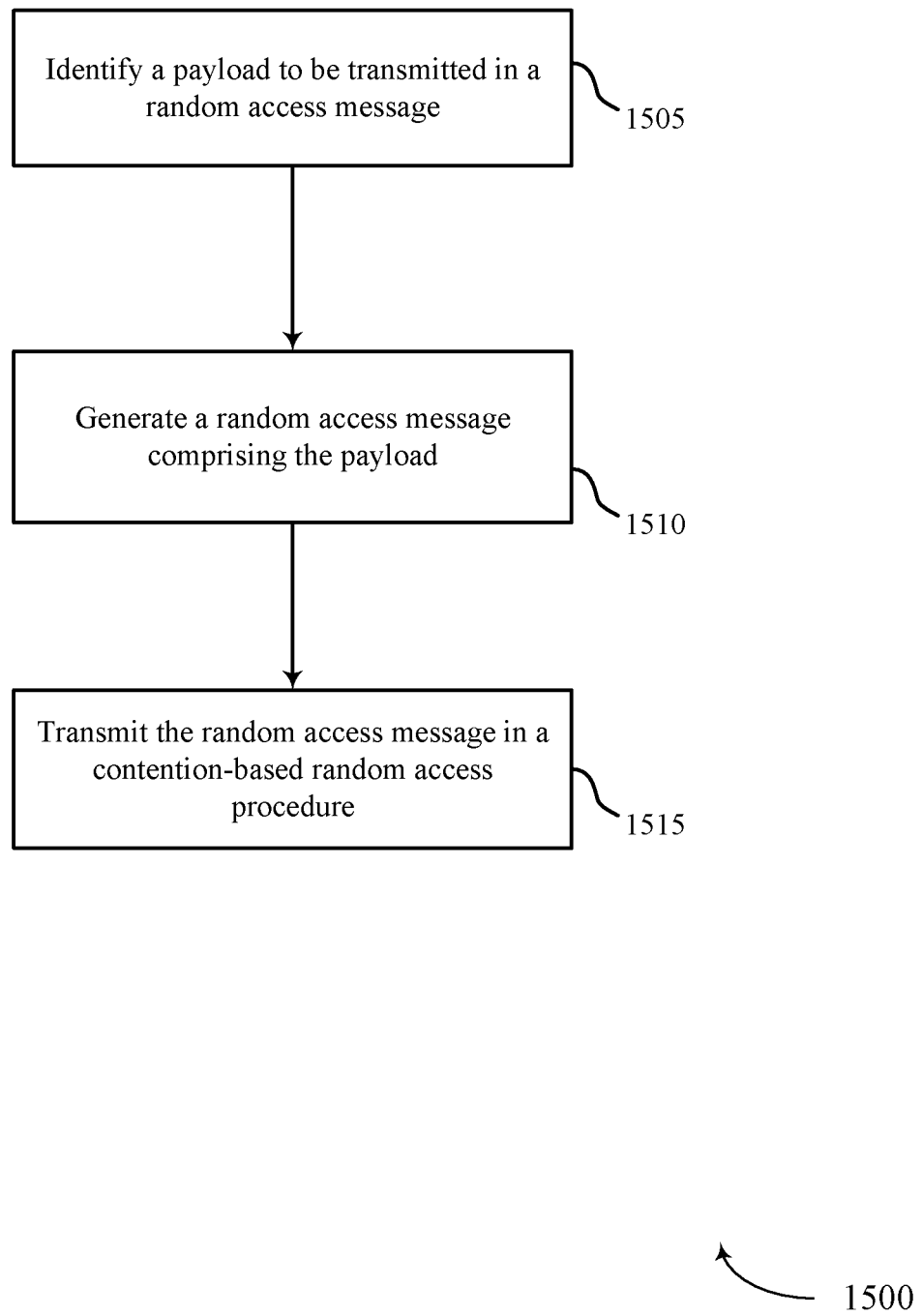
FIG. 15 shows a flowchart illustrating a method random access in low latency wireless communications in accordance with various aspects of the present disclosure.

FIG. 15 shows a flowchart illustrating a method 1500 for random access in low latency wireless communications in accordance with various aspects of the present disclosure. The operations of method 1500 may be implemented by a wireless device, including a UE 115, or its components, which may include wireless device 800 or wireless device 900, as described with reference to FIGS. 1-11. For example, the operations of method 1500 may be performed by the PRACH module 810 as described with reference to FIGS. 8-10. In some examples, the wireless device may execute a set of codes to control the functional elements to perform the functions described below. Additionally or alternatively, the wireless device may perform aspects the functions described below using special-purpose hardware.

At block 1505, the wireless device may identify a payload to be transmitted in a random access message, as described above with reference to FIGS. 1-7. In certain examples, the operations of block 1505 may be performed by the PRACH module 810 as described above with reference to FIGS. 8-10, by PRACH payload module 1015 as described above with reference to FIG. 10, or by PRACH module 1110 of FIG. 11.

At block 1510, the wireless device may generate a random access message comprising the payload, as described above with reference to FIGS. 1-7. In certain examples, the operations of block 1510 may be performed by the PRACH module 810 as described above with reference to FIGS. 8-10, by PRACH payload module 1015 as described above with reference to FIG. 10, or by PRACH module 1110 of FIG. 11.

At block 1515, the wireless device may transmit the random access message in a contention-based random access procedure, as described above with reference to FIGS. 1-7. In certain examples, the operations of block 1515 may be performed by the transmitter 815 and PRACH module 810 of FIGS. 8-10, or may be performed by antennas 1140, transceiver 1135, and PRACH module 1110 of FIG. 11.

Figure 16:
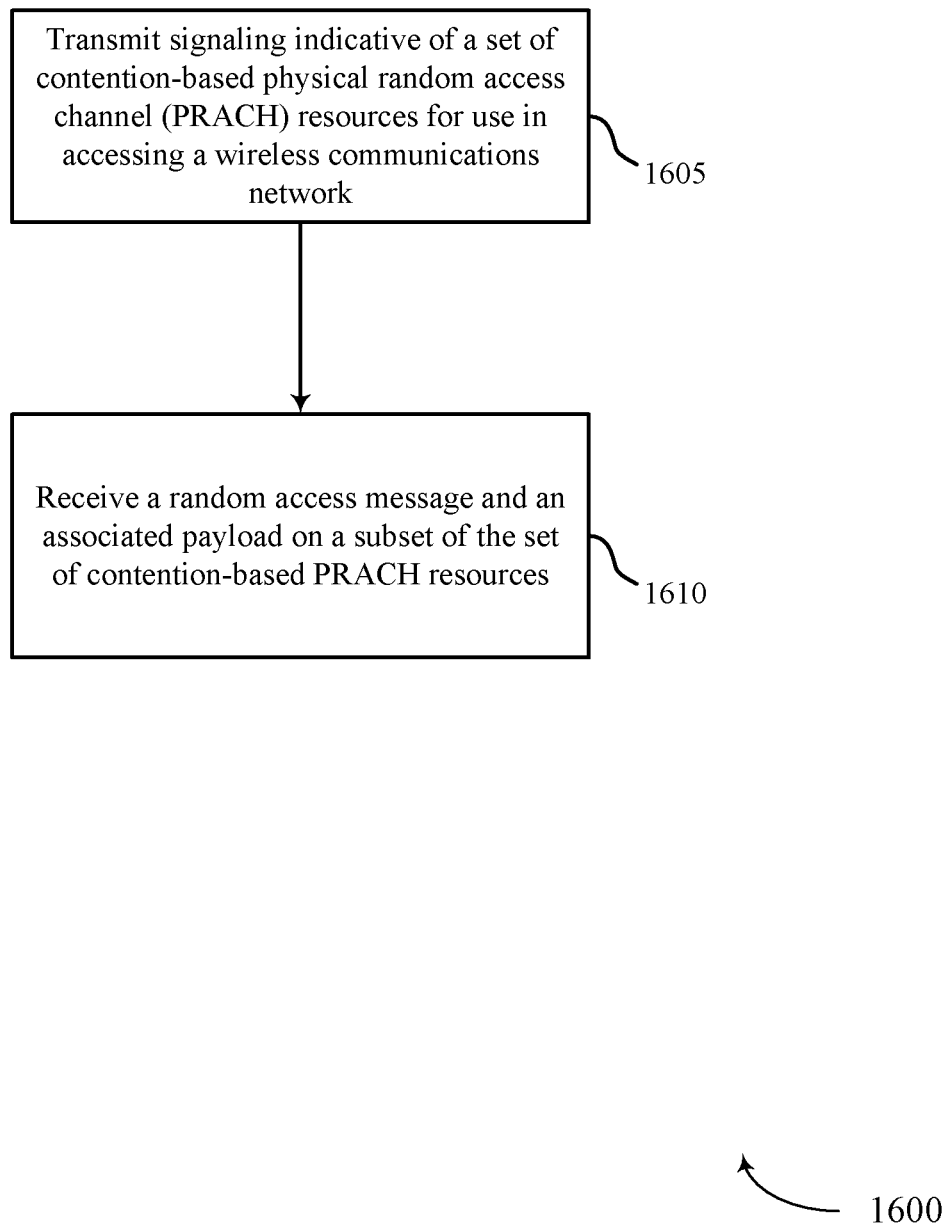
FIG. 16 shows a flowchart illustrating a method random access in low latency wireless communications in accordance with various aspects of the present disclosure.

FIG. 16 shows a flowchart illustrating a method 1600 for random access in low latency wireless communications in accordance with various aspects of the present disclosure. The operations of method 1600 may be implemented by a wireless device, including a base station 105, or its components, which may include wireless device 800 or wireless device 900, as described with reference to FIG. 1-10 or 12. For example, the operations of method 1600 may be performed by the PRACH module 810 as described with reference to FIGS. 8-10. In some examples, the wireless device may execute a set of codes to control the functional elements to perform the functions described below. Additionally or alternatively, the wireless device may perform aspects the functions described below using special-purpose hardware.

At block 1605, the wireless device may transmit signaling indicative of a set of contention-based physical random access channel (PRACH) resources for use in accessing a wireless communications network, as described above with reference to FIGS. 1-7. In certain examples, the operations of block 1605 may be performed by the transmitter 815 and PRACH module 810 as described above with reference to FIGS. 8-10 or by antennas 1240, transceiver 1235, and base station PRACH module 1210 of FIG. 12.

At block 1610, the wireless device may receive a random access message and an associated payload on a subset of the set of contention-based PRACH resources, as described above with reference to FIGS. 1-7. In certain examples, the operations of block 1610 may be performed by the receiver 805 and PRACH module 810 of FIGS. 8-10, or may be performed by antennas 1240, transceiver 1235, and base station PRACH module 1210 of FIG. 12.

Figure 17:
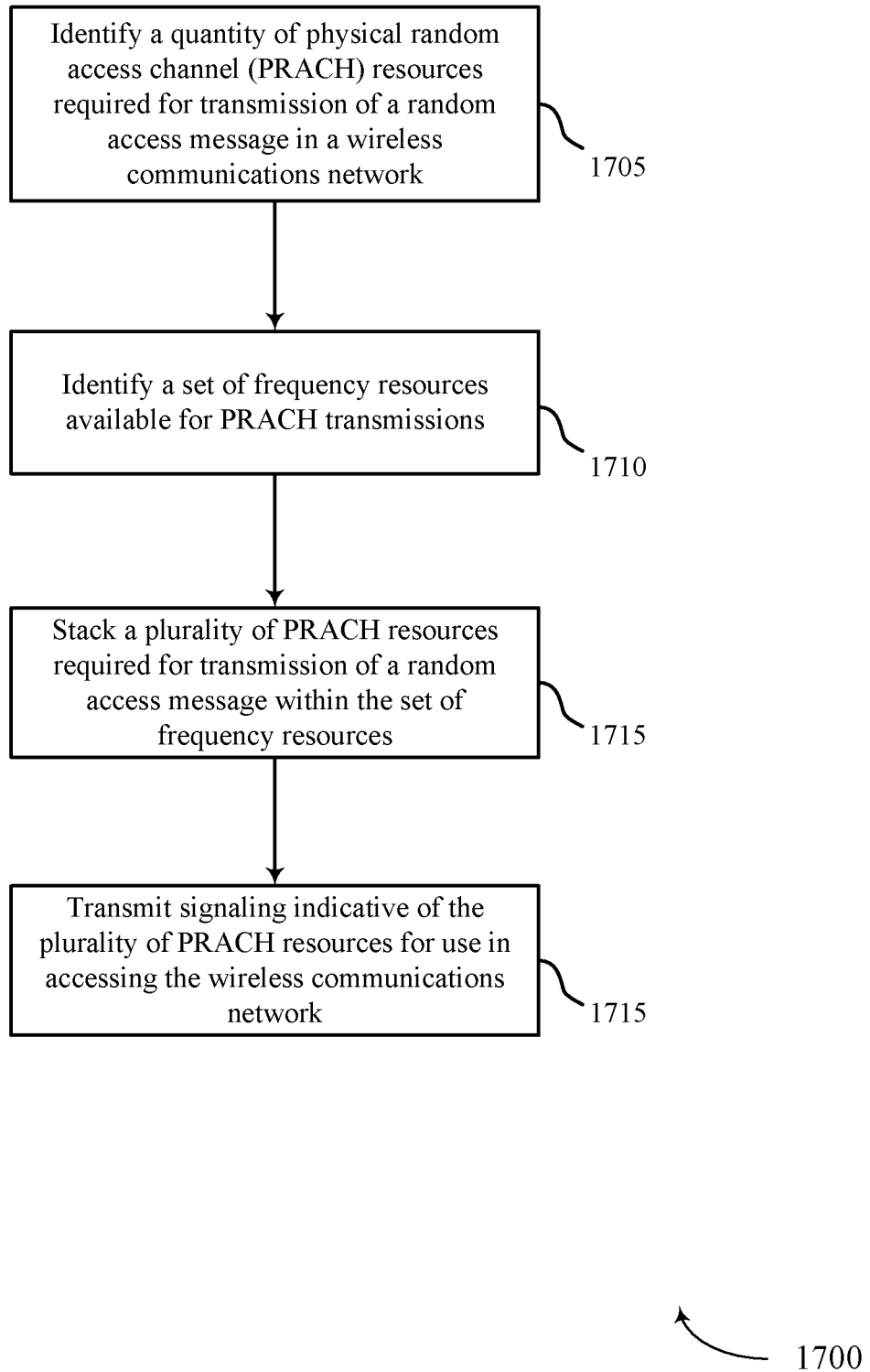
FIG. 17 shows a flowchart illustrating a method for random access in low latency wireless communications in accordance with various aspects of the present disclosure.

FIG. 17 shows a flowchart illustrating a method 1700 for random access in low latency wireless communications in accordance with various aspects of the present disclosure. The operations of method 1700 may be implemented by a wireless device, including a base station 105, or its components, which may include wireless device 800 or wireless device 900, as described with reference to FIG. 1-10 or 12. For example, the operations of method 1700 may be performed by the PRACH module 810 as described with reference to FIGS. 8-10. In some examples, the wireless device may execute a set of codes to control the functional elements to perform the functions described below. Additionally or alternatively, the wireless device may perform aspects the functions described below using special-purpose hardware.

At block 1705, the wireless device identify a quantity of physical random access channel (PRACH) resources required for transmission of a random access message in a wireless communications network, as described above with reference to FIGS. 1-7. In certain examples, the operations of block 1705 may be performed by the PRACH module 810 as described above with reference to FIGS. 8-10, by the resource selection module 1020 of FIG. 10, or by base station PRACH module 1210 of FIG. 12.

At block 1710, the wireless device may identify a set of frequency resources available for PRACH transmissions, as described above with reference to FIGS. 1-7. In certain examples, the operations of block 1710 may be performed by the PRACH module 810 as described above with reference to FIGS. 8-10, by the resource selection module 1020 of FIG. 10, or by base station PRACH module 1210 of FIG. 12.

At block 1715, the wireless device may stack a plurality of PRACH resources required for transmission of a random access message within the set of frequency resources, as described above with reference to FIGS. 1-7. In certain examples, the operations of block 1715 may be performed by the PRACH module 810 as described above with reference to FIGS. 8-10, by the resource selection module 1020 of FIG. 10, or by base station PRACH module 1210 of FIG. 12.

At block 1720, the wireless device may transmit signaling indicative of the plurality of PRACH resources for use in accessing the wireless communications network, as described above with reference to FIGS. 1-7. In certain examples, the operations of block 1720 may be performed by the transmitter 815 and PRACH module 810 as described above with reference to FIGS. 8-10 or by antennas 1240, transceiver 1235, and base station PRACH module 1210 of FIG. 12.

Thus, methods 1300, 1400, 1500, 1600, and 1700 may provide for random access in low latency wireless communications. It should be noted that methods 1300, 1400, 1500, 1600, and 1700 describe possible implementation, and that the operations and the steps may be rearranged or otherwise modified such that other implementations are possible. In some examples, aspects from two or more of the methods 1300, 1400, 1500, 1600, and 1700 may be combined.

The detailed description set forth above in connection with the appended drawings describes example configurations and does not represent all the examples that may be implemented or that are within the scope of the claims. The term "exemplary," as may be used herein, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving signaling indicative of a set of physical random access channel (PRACH) procedures for use in accessing a wireless communications network, the set of PRACH procedures including at least a first PRACH procedure and a second PRACH procedure, wherein the first PRACH procedure supports access to the wireless communications network with a total of two random access messages and the second PRACH procedure supports access to the wireless communications network with a total of more than two random access messages;
   selecting the first PRACH procedure of the set of PRACH procedures based at least in part on the received signaling,
   in responding to the selecting, identifying a data payload to be transmitted in a random access message;
   generating the random access message comprising the data payload;
   transmitting, to a base station, the random access message in a contention-based random access procedure, based on the first PRACH procedure; and
   transmitting, to the base station, a reference signal based at least in part on transmitting the random access message.

2. The method of claim 1, further comprising:
   identifying a set of resources available for transmitting the random access message;
   identifying reference signal resources available for transmitting the reference signal associated with the random access message;
   selecting first resources of the set of resources for transmitting the random access message; and
   transmitting the random access message using the first resources wherein transmitting the reference signal comprises transmitting, using the reference signal resources, the reference signal associated with the random access message using a cyclic shift associated with the first resources.

3. The method of claim 2, wherein the set of resources comprises a first subset of orthogonal frequency division multiplexing (OFDM) symbols and a second subset of OFDM symbols.

4. The method of claim 3, wherein the first subset of OFDM symbols and the second subset of OFDM symbols are symmetrically located on opposite sides of the reference signal resources.

5. The method of claim 2, wherein selecting the first resources is based at least in part on received signaling that indicates the first resources.

6. The method of claim 2, wherein selecting the first resources is based at least in part on a random selection of a subset of the set of resources.

7. The method of claim 1, transmitting the random access message comprises:
   transmitting the random access message based at least in part on a plurality of signals encoded using mutually orthogonal codes.

8. The method of claim 7, wherein the mutually orthogonal codes comprise Walsh codes.

9. The method of claim 1, transmitting the random access message comprises:
   transmitting the random access message using Walsh spreading across a set of resources available for transmitting the random access message.

10. A method of wireless communication at a base station, comprising:
    transmitting, to a user equipment (UE), signaling indicative of a set of contention-based physical random access channel (PRACH) resources for use in accessing a wireless communications network and a set of PRACH procedures including at least a first PRACH procedure and a second PRACH procedure, wherein the first PRACH procedure supports access to the wireless communications network with a total of two random access messages and the second PRACH procedure supports access to the wireless communications network with a total of more than two random access messages;

receiving, from the UE, a random access message and an associated data payload on a subset of the set of contention-based PRACH resources; and receiving, from the UE, a reference signal based at least in part on receiving the random access message.

11. The method of claim 10, wherein the signaling comprises:
an identification of a set of resources available for transmitting the random access message; and
an identification of reference signal resources available for transmitting the reference signal associated with the random access message.

12. The method of claim 11, wherein the set of resources comprises a first subset of orthogonal frequency division multiplexing (OFDM) symbols and a second subset of OFDM symbols.

13. The method of claim 12, wherein the first subset of OFDM symbols and the second subset of OFDM symbols are symmetrically located on opposite sides of the reference signal resources.

14. The method of claim 12, wherein the signaling further comprises an indication of the set of resources for use by at least a first user equipment (UE) for transmission of the random access message and the associated payload.

15. The method of claim 11, wherein the random access message is transmitted using Walsh spreading across the set of resources.

16. The method of claim 11, wherein the reference signal is transmitted using a cyclic shift associated with a first resource.

17. The method of claim 16, wherein the first resource is included in the set of resources.

18. An apparatus for wireless communication at a user equipment (UE), comprising:
a processor,
memory coupled with the processor; and
instructions stored in the memory and executable by the processor to cause the apparatus to:
receive signaling indicative of a set of physical random access channel (PRACH) procedures for use in accessing a wireless communications network, the set of PRACH procedures including at least a first PRACH procedure and a second PRACH procedure, wherein the first PRACH procedure supports access to the wireless communications network with a total of two random access messages and the second PRACH procedure supports access to the wireless communications network with a total of more than two random access messages;
select the first PRACH procedure of the set of PRACH procedures based at least in part on the received signaling,
in responding to the selecting, identify a data payload to be transmitted in a random access message;
generate the random access message comprising the data payload;
transmit, to a base station, the random access message in a contention-based random access procedure, based on the first PRACH procedure; and
transmit, to the base station, a reference signal based at least in part on transmitting the random access message.

19. The apparatus of claim 18, wherein the instructions are executable by the processor to cause the apparatus to:
identify a set of resources available for transmitting the random access message;
identify reference signal resources available for transmitting the reference signal associated with the random access message;
select first resources of the set of resources for transmitting the random access message;
transmit the random access message using the first resources, wherein transmitting the reference signal comprises transmitting, using the reference signal resources, the reference signal associated with the random access message using a cyclic shift associated with the first resources.

20. The apparatus of claim 19, wherein the set of resources comprises a first subset of orthogonal frequency division multiplexing (OFDM) symbols and a second subset of OFDM symbols.

21. The apparatus of claim 20, wherein the first subset of OFDM symbols and the second subset of OFDM symbols are symmetrically located on opposite sides of the reference signal resources.

22. The apparatus of claim 19, wherein selecting the first resources is based at least in part on received signaling that indicates the first resources.

23. The apparatus of claim 19, wherein selecting the first resources is based at least in part on a random selection of a subset of the set of resources.

24. The apparatus of claim 18, wherein the instructions to transmit the random access message are executable by the processor to cause the apparatus to:
transmit the random access message based at least in part on a plurality of signals encoded using mutually orthogonal codes.

25. The apparatus of claim 24, wherein the mutually orthogonal codes comprise Walsh codes.

26. The apparatus of claim 18, wherein the instructions to transmit the random access message are executable by the processor to cause the apparatus to:
transmit the random access message using Walsh spreading across a set of resources available for transmitting the random access message.

* * * * *